US012645658B2

(12) United States Patent
Chandramouli et al.

(10) Patent No.: US 12,645,658 B2
(45) Date of Patent: Jun. 2, 2026

(54) ADAPTIVE DATA STORAGE MANAGEMENT

(71) Applicant: Microsoft Technology Licensing, LLC, Redmond, WA (US)

(72) Inventors: Badrish Chandramouli, Redmond, WA (US); Xiangpeng Hao, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/673,255

(22) Filed: May 23, 2024

(65) Prior Publication Data

US 2025/0363084 A1 Nov. 27, 2025

(51) Int. Cl.
*G06F 16/22* (2019.01)
*G06F 16/23* (2019.01)

(52) U.S. Cl.
CPC ...... *G06F 16/2246* (2019.01); *G06F 16/2282* (2019.01); *G06F 16/2343* (2019.01)

(58) Field of Classification Search
None
See application file for complete search history.

(56) References Cited

U.S. PATENT DOCUMENTS

2021/0240628 A1* 8/2021 Meiri ................. G06F 16/1824

OTHER PUBLICATIONS

"The ubiquitous B-Tree"; Douglas Comer; Computing Surveys, vol. 11, No. 2, Jun. 1979 (Year: 1979).*
"RocksDB Secondary Cache", accessed on link https://rocksdb.org/blog/2021/05/27/rocksdb-secondary-cache.html, May 27, 2021, 13 pages.
Hao, et al., "Bf-Tree: A Modern Read-Write-Optimized Concurrent Larger-Than-Memory Range Index", Proceedings of the VLDB Endowment, vol. 14, Issue No. 1, 14 pages.
Liu, et al., "Pea Hash: A Performant Extendible Adaptive Hashing Index", In Proceedings of the ACM on Management of Data, vol. 1, Issue No. 1, 2023, 25pages.
Lu, et al., "APEX: A high-performance learned index on persistent memory", arXiv:2105.00683, 2021, 17 pages.
Luo, et al., "Breaking Down Memory Walls: Adaptive Memory Management in LSM-based Storage Systems", In Proceedings of the VLDB Endowment, vol. 14, Issue No. 3, 2020, pp. 241-254.
Mathew, et al., ". HydraList: A scalable in-memory index using asynchronous updates and partial replication", Proceedings of the VLDB Endowment, vol. 13, Issue No. 9, May 2020, pp. 1332-1345.

(Continued)

*Primary Examiner* — Michael Alsip
(74) *Attorney, Agent, or Firm* — Rainier Patents, P.S.

(57) ABSTRACT

The description relates to adaptive data storage management. An example manages data within a database system using dynamically adjustable mini-pages within a buffer pool. The example involves receiving a request for a data item, adjusting mini-page sizes based on the request, and determining the data item's presence within these mini-pages. Upon locating the item, the request is executed on the relevant mini-page. The example also updates a mapping table to correlate mini-page identifiers with their locations in the database, and selectively caches or evicts the data item based on probabilities and access patterns.

19 Claims, 13 Drawing Sheets

System 100

(56) References Cited

OTHER PUBLICATIONS

Mohan, et al., "Aries: A transaction recovery method supporting finegranularity locking and partial rollbacks using write-ahead logging", ACM Transactions on Database Systems, vol. 17, Issue No. 1, 1992, pp. 94-162.

Momjian, Bruce., "PostgreSQL: introduction and concepts", Addison-Wesley New York, vol. 192, 2001, 490 pages.

Neil, et al., "The log-structured merge-tree", Acta Informatica, vol. 33, 1996, pp. 351-385.

Qiao, et al., "Closing the B+-tree vs. LSM-tree Write Amplification Gap on Modern Storage Hardware with Built-in Transparent Compression", In 20th USENIX Conference on File and Storage Technologies, 2022, pp. 69-82.

Rosenblum, et al., "The design and implementation of a log-structured file system", ACM Transactions on Computer Systems, vol. 10, Issue No. 1, 1992, pp. 26-52.

Serebryany, et al., "AddressSanitizer: A fast address sanity checker", In USENIX annual technical conference, 2012, pp. 309-318.

Serebryany, Kosta., "Continuous Fuzzing with libFuzzer", In IEEE Cybersecurity Development, 2016, pp. 157-157.

Wang, et al., "Building a Bw-Tree Takes More Than Just Buzz Words", In Proceedings of the 2018 International Conference on Management of Data, 2018, pp. 473-488.

Wang, et al., "Sherman: A write-optimized distributed b+ tree index on disaggregated memory", In Proceedings of the International Conference on Management of Data, 2022, pp. 1033-1048.

Yan, et al., "Tiny-Tail Flash: Near-Perfect Elimination of Garbage Collection Tail Latencies in NAND SSDs", ACM Transactions on Storage, vol. 13, Issue No. 3, 2017, 26 pages.

Yang, et al., "Reducing garbage collection overhead in {SSD} based on workload prediction", In 11th USENIX Workshop on Hot Topics in Storage and File Systems, 2019, 6 pages.

Yang, et al., "SPDK: A development kit to build high performance storage applications", In IEEE 9th International Conference on Cloud Computing Technology and Science, 2017, pp. 154-161.

Yu, et al., "TreeLine: An Update-In-Place Key-Value Store for Modern Storage", Proceedings of the VLDB Endowment, vol. 16, Issue No. 1, 2022, pp. 99-112.

Zhang, et al., "NBTree: a Lock-free PM-friendly Persistent B+-Tree for eADR-enabled PM Systems", In Proceedings of the VLDB Endowment, vol. 15, Issue No. 6, 2022, pp. 1187-1200.

Zhang, et al., "Pipelined compaction for the LSM-tree", In IEEE 28th International Parallel and Distributed Processing Symposium, 2014. pp. 777-786.

Zhang, et al., "PLIN: A Persistent Learned Index for Non-volatile Memory With High Performance and Instant Recovery", Proceedings of the VLDB Endowment, vol. 16, Issue No. 2, 2022, pp. 243-255.

"Block Cache", accessed on link https://github.com/facebook/rocksdb/wiki/Block-Cache, 2023, 7 pages.

"RocksDB Bloom Filter", accessed on link https://github.com/facebook/rocksdb/wiki/RocksDB-Bloom-Filter, 2021, 9 pages.

Arulraj, et al., "BzTree: A High-Performance Latch-free Range Index for Non-Volatile Memory", In Proceedings of the VLDB Endowment, vol. 11, Issue No. 5, 2018, pp. 553-565.

Axboe, Jens., "Efficient IO with io_uring", accessed on link https://kernel.dk/io_uring.pdf, 2019, 17 pages.

Bender, et al., "An Introduction to B-trees and Write-Optimization", Login, vol. 40, Issue No. 5, 2015, 7 pages.

Bernstein, et al., "Concurrency control and recovery in database systems", Addison-Wesley Series in Computer Science, 1986, 58 pages.

Bornholt, et al., "Using lightweight formal methods to validate a key-value storage node in Amazon S3", In Proceedings of the ACM SIGOPS 28th Symposium on Operating Systems Principles, 2021, pp. 836-850.

Cao, et al., "Characterizing, modeling, and benchmarking {RocksDB}{Key-Value} workloads at facebook", In 18th USENIX Conference on File and Storage Technologies, 2020, pp. 209-223.

Cha, et al., "Blink-hash: An Adaptive Hybrid Index for In-Memory Time-Series Databases", Proceedings of the VLDB Endowment, vol. 16, Issue No. 6, 2023, pp. 1235-1248.

Chandramouli, et al., "Faster: A concurrent key-value store with in-place updates", In Proceedings of the International Conference on Management of Data, 2018, pp. 275-290.

Chandramouli, et al., "FASTER: an embedded concurrent key-value store for state management", Proceedings of the VLDB Endowment, vol. 11, Issue No. 12, 2018, pp. 1930-1933.

Chang, et al., "Bigtable: A distributed storage system for structured data", ACM Transactions on Computer Systems, vol. 26, Issue No. 2, 2008, 26 pages.

Conway, et al., "SplinterDB: Closing the Bandwidth Gap for NVMe Key-Value Stores", In USENIX Annual Technical Conference, 2020, pp. 49-63.

Crotty, et al., "Are you Sure you Want to Use MMAP in Your Database Management System?", In Conference on Innovative Data Systems Research, 2022, 7 pages.

Dayan, et al., "Chucky: A Succinct Cuckoo Filter for LSM-Tree", In Proceedings of the International Conference on Management of Data, 2021, pp. 365-378.

Debnath, et al., "BloomFlash: Bloom filter on flash-based storage", In 31st International Conference on Distributed Computing Systems, IEEE, 2011, pp. 635-644.

Debrabant, et al., "Anti-Caching: A New Approach to Database Management System Architecture", In Proceedings of the VLDB Endowment, vol. 6, Issue No. 14, 2023, pp. 1942-1953.

Dong, et al., "Rocksdb: Evolution of development priorities in a key-value store serving large-scale applications", ACM Transactions on Storage, vol. 17, Issue No. 4, 2021, 32 pages.

Duplyakin, et al., "The Design and Operation of CloudLab", In Proceedings of the USENIX Annual Technical Conference, 2019, 14 pages.

Eldawy, et al., "Trekking Through Siberia: Managing Cold Data in a Memory-Optimized Database", In Proceedings of the VLDB Endowment, vol. 7, Issue No. 11, 2014, pp. 931-942.

Evans, Jason., "A scalable concurrent malloc (3) implementation for FreeBSD", In Proc. of the bsdcan conference, Apr. 16, 2006, 14 pages.

Gaffney, et al., "SQLite: past, present, and future", In Proceedings of the VLDB Endowment, vol. 15, Issue No. 12, 2022, pp. 3535-3547.

Ghemawat, Sanjay., "LevelDB is a fast key-value storage library written at Google", accessed on link https://github.com/google/leveldb, Feb. 24, 2021, 7 pages.

Graefe, Goetz., "Modern B-Tree Techniques", Foundations and Trends in Databases, vol. 3, Issue No. 4, 2011, pp. 203-402.

Gregg, Brendan., "The Flame Graph", ACM, vol. 59, Issue No. 6, 2016, pp. 48-57.

Haas, et al., "What Modern NVMe Storage Can Do, and How to Exploit it: High-Performance I/O for High-Performance Storage Engines", Proceedings of the VLDB Endowment, vol. 16, Issue No. 9, 2023, pp. 2090-2102.

Hao, et al., "Towards Buffer Management with Tiered Main Memory", In Proc. ACM Manag. Data, vol. 2, Issue No. 1, 2024, 26 pages.

He, et al., "Evaluating Persistent Memory Range Indexes: Part Two [Extended Version]", arXiv:2201.13047, 2022, 15 pages.

Henry, Gavin., "Howard chu on lightning memory-mapped database", IEEE Software, vol. 36, Issue No. 06, 2019, pp. 83-87.

Hu, et al., "Halo: A hybrid PMem-DRAM persistent hash index with fast recovery", In Proceedings of the 2022 International Conference on Management of Data, 2022, pp. 1049-1063.

Huang, et al., "TiDB: a Raft-based HTAP database," Proceedings of the VLDB Endowment, vol. 13, Issue No. 12, 2020, pp. 3072-3084.

Jung, et al., "RustBelt: Securing the foundations of the Rust programming language", In Proceedings of the ACM on Programming Languages, vol. 2, 2018, 34 pages.

Kang, et al., "PIM-tree: A Skew-resistant Index for Processing-in-Memory", In Proceedings of the ACM Workshop on Highlights of Parallel Computing, 2023, 14 pages.

(56)        References Cited

OTHER PUBLICATIONS

Kargar, et al., "Hamming Tree: The Case for Energy-Aware Indexing for NVMs", In Proceedings of the ACM on Management of Data, vol. 1, Issue No. 2, 2023, 27 pages.

Kim, et al., "ERMIA: Fast Memory-Optimized Database System for Heterogeneous Workloads", In Proceedings of the 2016 International Conference on Management of Data, 2016, pp. 1675-1687.

Lee, et al., "WALTZ: Leveraging Zone Append to Tighten the Tail Latency of LSM Tree on ZNS SSD", In Proceedings of the VLDB Endowment, vol. 16, Issue No. 11, 2023, pp. 2884-2896.

Lee, Seok., "Technology scaling challenges and opportunities of memory devices", In IEEE International Electron Devices Meeting, 2016, 8 pages.

Leijen, et al., "Mimalloc: Free list sharding in action", In Programming Languages and Systems: 17th Asian Symposium, Springer, 2019, pp. 244-265.

Leis, et al., "LeanStore: In-Memory Data Management beyond Main Memory", In 34th International Conference on Data Engineering, 2018, 12 pages.

Leis, et al., "The adaptive radix tree: ARTful indexing for main-memory databases", In IEEE 29th International Conference on Data Engineering, 2013, pp. 38-49.

Leis, et al., "The Art of practical synchronization", In Proceedings of the 12th International Workshop on Data Management on New Hardware, 2016, 8 pages.

Lersch, et al., "Evaluating persistent memory range indexes," In Proceedings of the VLDB Endowment, vol. 13, Issue No. 4, 2019, pp. 574-587.

Levandoski, et al., "The Bw-Tree: A B-tree for new hardware platforms", In IEEE 29th International Conference on Data Engineering, 2013, pp. 302-313.

Li, Amanda, et al., "BP-Tree: Overcoming the Point-Range Operation Tradeoff for In-Memory B-trees", Massachusetts Institute of Technology, 2023, 53 pages.

Li, et al., "Performant almostlatch-free data structures using epoch protection", In Proceedings of the 18th International Workshop on Data Management on New Hardware, 2022, 10 pages.

Lin, et al., "Segmented fuzzy checkpointing for main memory databases", In Proceedings of the ACM Symposium on Applied Computing, Association for Computing Machinery, 1996, pp. 158-165.

Lu, et al., "Wisckey: Separating keys from values in ssd-conscious storage", In ACM Transactions on Storage, vol. 13, Issue No. 1, 2017, 28 pages.

Neil, et al., "The log-structured merge-tree", Acta Informatica, vol. 33, 1996, pp. 251-385.

Zhou, et al., "Two is Better Than One: The Case for 2-Tree for Skewed Data Sets", memory, vol. 11, 2023, 9 pages.

* cited by examiner

System <u>100</u>

Bf-Tree 104

Inner Nodes 202 (4KB)

Mini pages 204 (64B-4KB)

Buffer Pool 108

Leaf Pages 206 (4KB)

Mapping Table 208

Memory 326

Data Storage 106

```
1  def get(key) :
2    (mini_page, leaf_page) = traverse (key)
3    if mini_page:
4      result = mini_page.binary_search (key)
5      if result:
6        # early terminate if found
7        return result
8
9    # otherwise, read from the leaf page
10   result = leaf_page.binary_search (key)
11   if rand() < 0.01:
12     # with a small probability , cache it in the mini-page
13     mini_page.insert_or_create (result)
14   return result
```

FIG. 6

```
1  def get(key) :
2    (mini_page, leaf_page) = traverse (key)
3    ok = mini_page.instert (key, value)
4    if ok:
5      # early terminate if insert succeeds
6      return
7
8    new_size = mini_page.next_size()
9    if new_size == 0:
10     # need to merge to the base page
11     mini_page.merge()
12     mini_page.insert(key, value)
13     return
14   else:
15     # need to grow the mini-page
16     mini_page.resize(new_size)
17     mini_page.insert(key, value)
17     return
```

FIG. 7

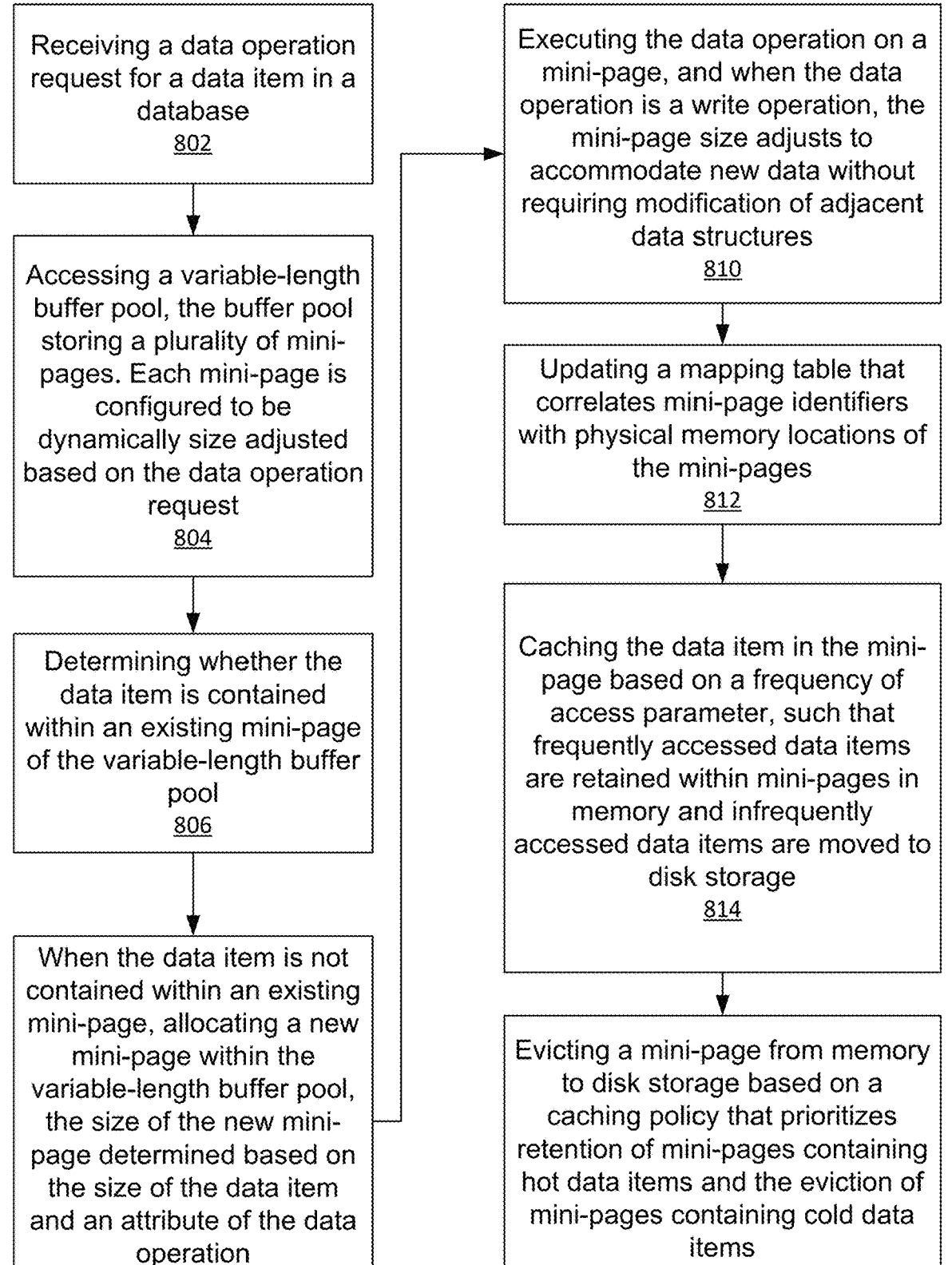

Receiving a data operation request for a data item in a database
802

Accessing a variable-length buffer pool, the buffer pool storing a plurality of mini-pages. Each mini-page is configured to be dynamically size adjusted based on the data operation request
804

Determining whether the data item is contained within an existing mini-page of the variable-length buffer pool
806

When the data item is not contained within an existing mini-page, allocating a new mini-page within the variable-length buffer pool, the size of the new mini-page determined based on the size of the data item and an attribute of the data operation
808

Executing the data operation on a mini-page, and when the data operation is a write operation, the mini-page size adjusts to accommodate new data without requiring modification of adjacent data structures
810

Updating a mapping table that correlates mini-page identifiers with physical memory locations of the mini-pages
812

Caching the data item in the mini-page based on a frequency of access parameter, such that frequently accessed data items are retained within mini-pages in memory and infrequently accessed data items are moved to disk storage
814

Evicting a mini-page from memory to disk storage based on a caching policy that prioritizes retention of mini-pages containing hot data items and the eviction of mini-pages containing cold data items
816

FIG. 8

Workload:
Zipf(0.9) with 30% memory/data

B-Tree:
Standard B-Tree with page cache

LSM-Tree:
RocksDB with row cache and
block cache

ADAPTIVE DATA STORAGE MANAGEMENT

BACKGROUND

Database systems traditionally utilize B-trees for indexing and managing large volumes of data that exceed the size of available memory. Ideally, B-trees are designed to facilitate efficient data retrieval and manipulation across both in-memory and on-disk structures. However, the practical implementation of B-trees often faces significant challenges related to write amplification and inefficient caching. As a result, the theoretical advantages of B-trees, such as quick data access and efficient space utilization, are not fully realized in environments with high data modification rates and large datasets. This diminishes their effectiveness in modern database applications that demand rapid data processing and scalability.

SUMMARY

This patent pertains to database systems and specifically to the management of data using B-trees and a variant, the Bf-Tree, in environments where data exceeds available memory. Typically, B-trees are structured to efficiently handle large datasets across both memory and disk storage. However, this efficiency can be compromised in real-world applications due to the inherent issues of write amplification and inefficient caching strategies that plague conventional B-tree implementations. Studies indicate that these issues significantly degrade performance in systems handling frequent data updates and large volumes of data.

The present concepts introduce the 'Bf-Tree', a dynamic variant of the traditional B-tree, which addresses these challenges by employing dynamically adjustable mini-pages within a buffer pool. This approach provides a technical solution that allows for the on-the-fly resizing of mini-pages based on real-time data operation requirements, significantly reducing write amplification by isolating data modifications to smaller, more manageable chunks of data and enhancing caching efficiency by storing only frequently accessed data in faster memory.

The Bf-Tree features described herein are configured to dynamically manage mini-pages that adapt to data volume changes, thus supporting high throughput and low latency operations in database environments. For instance, the Bf-Tree can adjust the size of its mini-pages during write operations to accommodate new data without requiring full-page rewrites, and it employs an intelligent caching mechanism that prioritizes data based on probabilities and access patterns, ensuring that hot data is readily available in memory while cold data is efficiently moved to disk storage.

This Summary aims to outline some of the core improvements offered by the Bf-Tree concepts and highlight some of the salient features of database management techniques incorporating the same. The description is intended to provide a general overview and is not meant to be exhaustive or to limit the scope of the inventive concepts.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 6 is an example pseudocode that embodies a GET operation.

FIG. 7 is an example pseudocode that embodies an INSERT operation.

FIG. 8 is a flowchart of an example method of the present technology.

DETAILED DESCRIPTION

Overview

Figure 1:
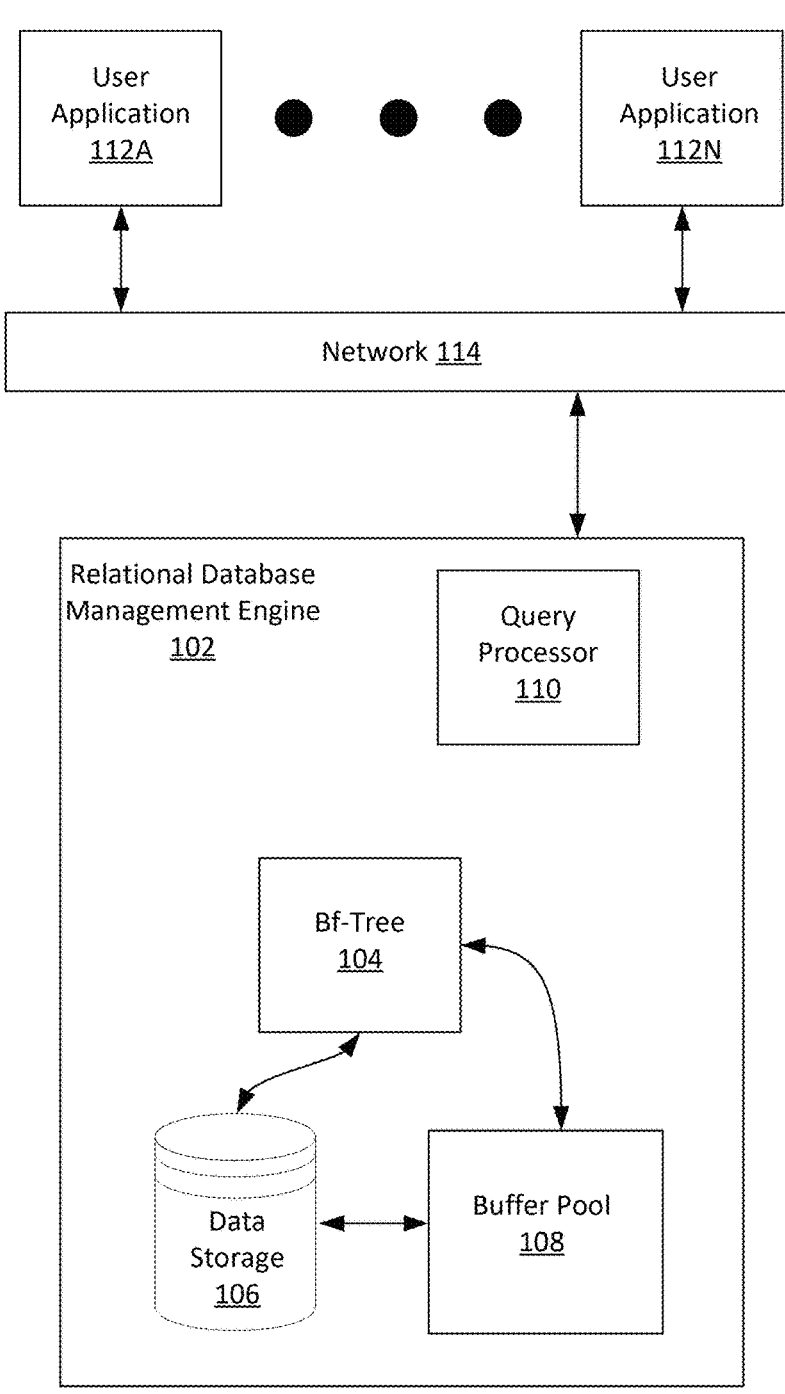
FIG. 1 is a schematic view of a simplified computing architecture that can be used to practice aspects of the present technology.

For context, the evolution of database systems has seen advancements in the design of B-Trees (Balanced Trees) and LSM-Trees (Log-Structured Merge Trees), which are useful in managing larger-than-memory data systems. Traditionally, B-Trees have been optimized for read operations while LSM-Trees cater predominantly to write-intensive workloads. However, modern applications demand that both data structures handle read and write operations more efficiently and simultaneously.

B-Trees efficiently organize data by keeping frequently accessed (hot) pages in memory and less frequently accessed (cold) pages on disk, enabling them to manage data that exceeds memory limits. This structure supports efficient point lookups through a hierarchical traversal from the root to the relevant leaf node, significantly speeding up data access with minimal I/O operations. Despite this efficiency, B-Trees struggle with write amplification due to the large disparity between the sizes of data records and pages, which necessitates full-page writes even for small data changes. Strategies like the delta chain approach in the Bw-Tree (B-link Tree) have been developed to address this, reducing unnecessary data rewrites by appending changes to in-memory delta chains before batch updating the base pages.

On the other hand, LSM-Trees, known for their write optimization, handle incoming data writes by buffering them in an in-memory structure and periodically flushing this data to disk in a structured compaction process. This method is efficient for data ingestion but introduces challenges during data retrieval, especially during point lookups and range scans, as it requires searching across multiple data levels. Techniques like Bloom filters and block caches are used to mitigate these inefficiencies by reducing unnecessary disk I/Os.

The landscape of database storage has changed with the introduction of modern NVMe SSDs, which provide fast access speeds and support high-throughput data operations, challenging the traditional assumptions of both B-Trees and LSM-Trees designed primarily for spinning disk technologies. Modern SSDs, characterized by their lack of moving parts and ability to handle parallel data operations, offer nearly equal performance for random and sequential writes. This capability necessitates a reevaluation of the data management strategies employed by B-Trees and LSM-Trees. Additionally, advancements in kernel bypass IO technologies like SPDK and io_uring further optimize data operations by reducing the overhead caused by traditional OS-level data handling.

In summary, while B-Trees and LSM-Trees have provided foundational data management capabilities, evolving hardware technologies and changing application requirements continue to drive innovations in their architectures to better manage the trade-offs between read and write operations and fully leverage modern storage technologies.

The present concepts are configured to implement a Bf-Tree to address the limitations encountered in large-scale database systems. Traditional B-trees, while effective for moderate-sized data sets, exhibit significant performance degradation when scaling to handle data that exceeds the capacity of system memory. Again, this is primarily due to high write amplification and inefficient caching strategies that fail to adapt to the diverse nature of modern data access patterns.

In some implementations, the Bf-Tree includes dynamically adjustable mini-pages within a variable-length buffer pool. This feature allows the Bf-Tree to adjust the size of mini-pages on-the-fly, in response to the specific needs of the data operations being performed. Such flexibility significantly reduces write amplification by minimizing unnecessary rewrites of large data pages when only small portions of data need updating. The use of mini-pages also enables more granular control over data placement and retrieval, optimizing the performance of read and write operations.

Furthermore, the Bf-Tree enhances caching efficiency by implementing an intelligent caching mechanism that prioritizes the retention of frequently accessed data in the faster, more accessible memory layers. This approach not only improves data retrieval times but also reduces the operational overhead associated with managing large volumes of cold data, which can be relegated to slower, more cost-effective storage solutions. The selective caching mechanism leverages real-time usage analytics to adjust the caching strategy dynamically, ensuring optimal data availability and system responsiveness. Overall, the Bf-Tree architecture offers a robust technical solution for managing extensive data sets in environments where performance, scalability, and efficient resource utilization are paramount.

Example Implementations

FIG. 1 illustrates an example architecture of a system 100 that can be used to practice aspects of the present technology. System 100 can be implemented within the context of a database or other similar data storage structure, either virtual or physical.

System 100 can include a relational database management engine (engine 102), a Bf-Tree 104, data storage 106, buffer pool 108, query processor 110, and user application(s) 112A-112N. The components of the system 100 can communicate through a network 114, which can include any public and/or private network. It will be understood that the components and configuration of FIG. 1 are a non-limiting example of one architecture. A person of ordinary skill in the art will recognize that the features of the present technology, namely the Bf-Tree can be implemented in many forms and configurations.

In general, a user application of the user application(s) 112A-112N, or any input mechanism can generate a request. User applications initiate the data operations that the system 100 processes. Essentially, these applications generate various types of requests, including queries for data retrieval (reads), data insertion or modification (writes), and updates, which are directly handled by the engine 102. These operations make direct use of the dynamic capabilities of the Bf-Tree 104, namely functions related to optimizing data retrieval and storage. When a user application submits a query or a transaction, such a request engages the database's query processor 110, which in turn utilizes the Bf-Tree 104 for efficient data indexing and retrieval.

It will be understood that the system 100 can process various read requests in the Bf-Tree 104. One example includes a read by key, which is a point read of a single key. Another example is a key range scan, which is a request to read all records in a specified key range, e.g., read all records with a key value falling in the range between 50 and 60, inclusive. The Bf-Tree 104 supports both of these read operations using the mini-page design. With respect to range scans, the system can handle key range scan queries by reading both mini-pages and the corresponding disk pages if the mini-page does not cover an entire range gap.

In some instances, a mini-page can store data sorted by the key, analogous to disk pages in B-Trees. This allows range scan and fast location of a specific key using binary search. The inner pages of the Bf-Tree are kept pinned in the main memory in the Bf-Tree design, while the leaf pages are always on disk. The mini-pages can be kept in memory, where each mini-page corresponds to some leaf page on disk.

To optimize performance for point lookups and range scans, data within the mini-page can be stored in a sorted order by key. This sorting is critical because it ensures that operations within the mini-page, such as point lookups and range scans, can be executed in logarithmic time O(log N) rather than linear time O(N). Storing data in this manner allows for efficient binary searching, significantly speeding up data retrieval and maintaining high throughput, which is useful for handling large volumes of data efficiently. To be sure, point lookups within a mini-page are log N where N is the number of keys in the mini-page. Range scans are log N+O, where O is the number of keys returned by the scan.

The query processor 110 provides various features in managing and executing database operations. For example, the query processor 110 begins by parsing and analyzing SQL queries submitted by user application(s) 112A-112N to extract the essential elements and intended operations. Following this initial analysis, the query processor 110 optimizes the execution plans based on the structure of the database, the state of the data, and the indexing provided by the Bf-Tree 104. This optimization could include reordering operations, selecting the most efficient index paths, and utilizing the Bf-Tree's 104 capabilities to dynamically adjust mini-pages, thereby reducing data access times and improving overall system performance.

Once optimized (not required in all instances), the query processor 110 executes the queries against the database using the Bf-Tree 104. For example, the query processor 110 handles logical interactions between the buffer pool 108 where data is cached, and the actual data storage on disk at the data storage 106. In general, the query processor 110 can make decisions about data caching, retrieval, and storage based on the frequency and type of data accesses, as described in the Bf-Tree's design. This ensures that hot (e.g., high frequency) data stays readily accessible in the cache of the buffer pool 108, while colder (e.g., low frequency) data is managed more economically at the storage level in the data storage 106, leveraging the Bf-Tree's efficiency in handling large datasets and complex queries.

The data storage 106 (e.g., storage system) is provided for long-term preservation and organization of data within the system 100. It serves as the primary repository where all data managed by the system 100 is stored, including the structured data accessed and manipulated through the Bf-Tree 104. The data storage 106 is designed to handle large volumes of data efficiently, ensuring data is available for both immediate access and future retrieval.

Data storage 106 can encompass a variety of storage media, such as hard disk drives (HDDs) or solid-state drives (SSDs), chosen based on performance needs and cost considerations. It is structured to optimize data retrieval and storage operations, which are used for maintaining the performance of the engine 102. The arrangement of data within this storage is managed by the engine 102, which decides how data is organized, partitioned, and indexed to support efficient query processing and data management.

Furthermore, the integration of data storage 106 with the buffer pool 108 and the Bf-Tree 104 enhances the system's overall performance. While the buffer pool 108 temporarily holds frequently accessed data to speed up read and write operations, the data storage 106 ensures the durability and persistence of this data. When data in the buffer pool is modified, these changes are eventually written back to data storage 106 to ensure that they are not lost in case of a system failure, for example. In some instances, the buffer pool 108 includes a variable-length buffer pool, which is described in greater detail infra.

The buffer pool 108 in the system 100 serves as an intermediary between the data storage 106 and the operations performed by the engine 102. It is designed to enhance the performance of the database by reducing the frequency of disk I/O operations required during data processing. By storing copies of frequently accessed data pages in memory, the buffer pool 108 allows for quicker data retrieval and improves the overall efficiency of the database operations.

Functionally, the buffer pool 108 manages the caching of data pages that are most frequently accessed or recently used. This caching strategy is crucial in environments with intensive read and write operations, as it significantly decreases the response time for queries and minimizes the load on the underlying data storage 106. The buffer pool is dynamically managed by the database engine, which implements algorithms to determine which data pages should be retained in memory and which should be evicted when space is needed for new pages.

Moreover, the buffer pool 108 is directly influenced by the Bf-Tree 104, which helps optimize the storage and retrieval of data within this memory space. The Bf-Tree's dynamic mini-page architecture allows for flexible adaptation to varying data access patterns, enabling more efficient use of the buffer pool's memory. This interaction ensures that the database can quickly adapt to changes in workload, maintaining high levels of performance without excessive reliance on physical disk access.

The engine 102 processes and executes the SQL commands that are analyzed and passed on by the query processor 110. The engine 102 translates these commands into actionable operations that manipulate data within the database's underlying structures. The engine 102 leverages the Bf-Tree 104 to enhance data retrieval and manipulation. By interacting with this dynamic indexing mechanism of the Bf-Tree 104, the engine 102 can efficiently navigate through the database, making efficient use of the Bf-Tree 104 to adjust mini-pages dynamically based on current workload demands.

In managing data flow within the system, the engine 102 can coordinate interactions between the buffer pool 108 and the data storage 106. The engine 102 ensures that frequently accessed data is cached effectively in the buffer pool 108, thereby reducing I/O operations and speeding up data access. The engine 102 also manages the writing back of modified data to data storage 106, utilizing the Bf-Tree 104 to optimize the placement and retrieval of data.

Turning now to the Bf-Tree 104, it will be understood that two major problems of conventional B-Trees include write amplification and inefficient caching. These issues stem from the fact that disk pages are much larger than individual records. This granularity mismatch fundamentally limits the performance of B-Trees, forcing them to either cache cold records or write the entire page for a single record update.

The Bf-Tree 104 is an advanced variant of the traditional B-Tree, designed to optimize performance across a range of database operations including point lookups, range scans, and write processes. Characterized by the inclusion of mini-pages and a variable-length buffer pool, the Bf-Tree significantly provides a technical solution that reduces write amplification and enhances caching efficiency. Although primarily a data structure, the Bf-Tree's functionality extends to serving as an index within database systems, where it efficiently organizes and retrieves data by dynamically adjusting mini-pages based on operational demands. This flexibility makes the Bf-Tree 104 particularly effective in environments where low latency and high throughput are preferred, thereby aligning with the needs of modern database applications and storage architectures.

A traditional B-Tree's page organization is suitable for block devices and naturally implements page-based caching. However, the cache does not have to be page-based, as memory is byte-addressable. By having variable-length pages, memory caches no longer need to align to disk pages.

Instead, they have the freedom to cache the data that is accessed frequently. With respect to the Bf-Tree, this means it can cache the "read hot" part of a page to serve reads efficiently and the "write hot" part of a page to absorb updates (often in-place) as much as possible before batch writes to disk. A Bf-Tree can also grow to cache the entire range gap if needed.

Figure 2:
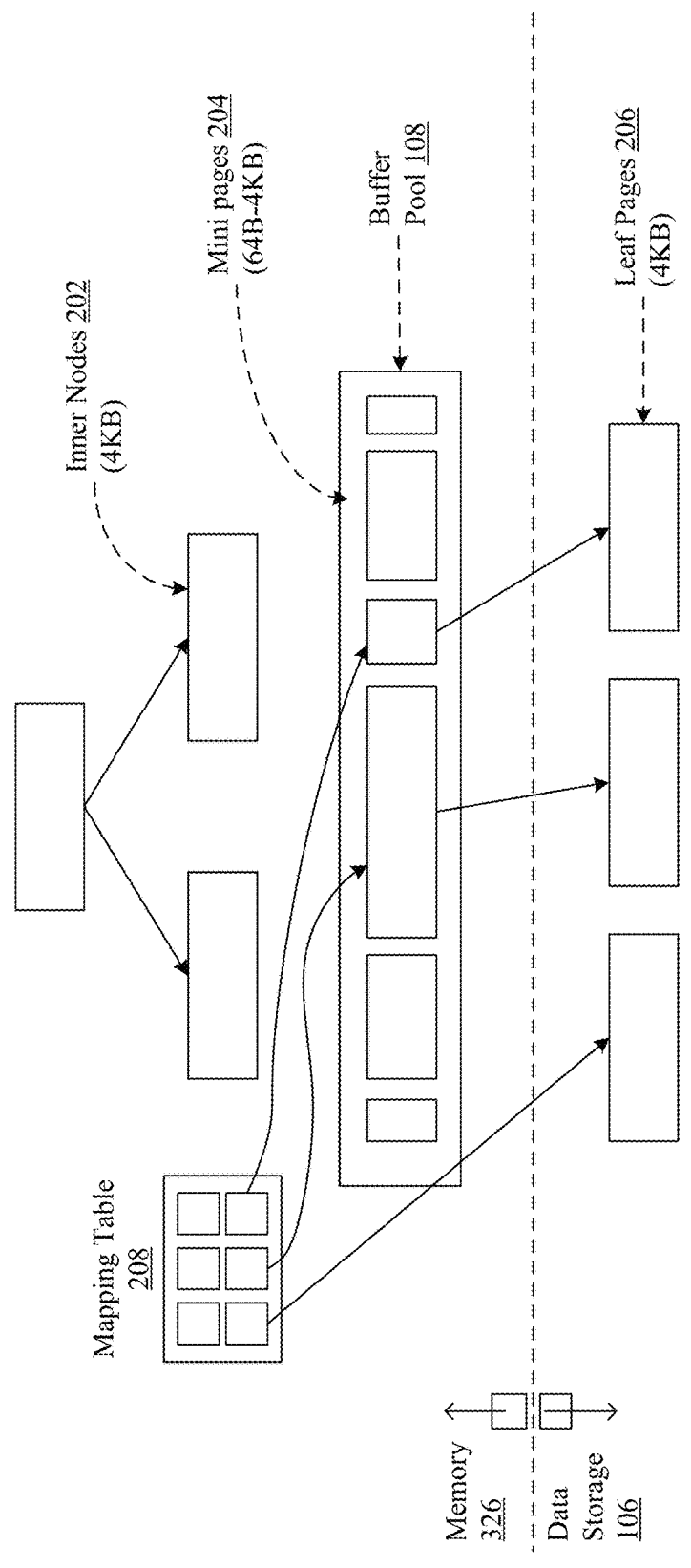
FIG. 2 is a schematic diagram of an example Bf-Tree structure of the present technology.

The Bf-Tree 104 leverages mini-pages within the buffer pool 108 to support efficient data management tasks such as point lookup, range scan, and write operations. FIG. 2 provides a visual representation of the Bf-Tree's architecture, showing how it integrates various components. Specifically, the Bf-Tree 104 includes inner nodes 202; the buffer pool 108, which caches these mini-pages 204; and on-disk leaf pages 206. Additionally, a mapping table 208 is used to correlate the mini-pages with their respective on-disk leaf pages 206. This high-level configuration of the buffer pool 108 is designed to handle mini-pages of variable lengths, enhancing the system's efficiency and adaptability. The leaf pages 206 are stored within the data storage 106, ensuring durable data retention.

The mapping table 208 correlates both mini-page and (disk) leaf-page identifiers to a location in memory or disk, respectively. Each mini-page can include a pointer to the corresponding leaf-page on disk. In some implementations, there is a 1:1 mapping between a mini-page and a corresponding leaf-page on disk.

It will be understood that in some embodiments, each mini-page can be backed by a disk-resident leaf-page corresponding to standard B-Tree pages. In some implementations, the mini-page 204 organizes the data in a specific way, including keeping the keys sorted, keeping a header to (among other things) point to the corresponding disk leaf-page, and accommodating variable-length values.

It will be understood that a mini-page 204 can be implemented as an in-memory slim version of the corresponding leaf page 206. A mini-page serves two example, non-limiting purposes. First, the mini-page can be used to buffer recent updates and to cache frequently accessed records. Second, mini-pages are for leaf pages only (i.e., not for inner nodes), and each leaf page may have at most one corresponding mini-page.

Records in a mini-page 204 are maintained as sorted, preserving spatial locality. This allows records to be efficiently searched using binary search, unlike the delta chain approach which requires a sequence of pointer chases to find the target record.

In one example, a write operation tries to insert to the mini-already have a mini-page, the write operation creates a minimal-sized (e.g., 64 bytes to align with a cache line) mini-page that can contain the new record. If the mini-page 204 is full, it grows to accommodate the new records. Each time, the mini-page 204 doubles its size until it can accommodate the new record. Ultimately, the mini-page can grow too large (up to 4 KB), which can cause the insertion/search performance to degrade. Then, or when the mini-page 204 needs to be evicted from memory, the mini-page can be included in a batch-write and the mini-page can be merged into a base leaf page.

Before reading the leaf page 206 from data storage 106, a read operation first (binary) searches the mini-page 204 for the desired record and terminates early if the record is found. Searching the mini-page is efficient as the records are sorted and in memory (in the buffer pool 108). If the record is not found in the mini-page, a corresponding leaf page can be loaded from disk (data storage 106).

After reading the record from data storage 106, the record can be cached by inserting the record into the mini-page 204. This allows future read operations to terminate the search early. Note that the mini-page 204 will cache the individual records, not the entire page, avoiding the inefficient page-level caching of conventional B-Trees. To avoid flooding the mini-page with cold records, only hot records from the leaf page are cached and can be determined as records having a low probability, for example, one percent. Caching hot records is implemented as an in-memory insert operation to the mini-page, which may allow the mini-page to grow as needed.

In some instances, the system can selectively cache the data item or evict the data item from the buffer pool to disk storage. In one example, a record that is read can be promoted into the mini-page 204 based on a probability, so that only the frequently read records enter the mini-page. This approach requires no additional state or overhead. Records that are written, on the other hand, are always first cached in the mini-page 204. In another example, mini-pages can be evicted based on either becoming full or access patterns, i.e., when the mini-page is in the copy-on-access region, an access action will move the mini-page to the tail and keep the mini-page alive in memory. Access in the copy-on-access region (could be reads or writes) causes the system to determine what part of the mini-page to copy to the tail address.

In one example, when the data item is cached in a mini-page, the process of caching can include a process of adjusting the probability of caching additional records within the same mini-page based on a pre-determined threshold. The pre-determined threshold pertains to data item accesses, such that the mini-page grows to accommodate additional records only when existing records meet a minimum frequency of access.

Record caching does not help with range scans because the range query has to look at the leaf page for the full set of records; in other words, record caching breaks the spatial locality needed for range scans. On the other hand, a page-level cache is ideal for range scans, as it preserves the spatial locality of records.

When a mini-page 204 grows to the full size, the mini-page 204 can be merged (if necessary) and converted into a full leaf page 206 mirroring disk. Unlike systems such as RocksDB, where static memory partitioning is required for row-cache and block-cache, mini-pages in the Bf-Tree 104 automatically adapt to workload changes (e.g., point or range query intensive). This allows the same memory budget to be used for both range and point queries.

A mini-page 204 and leaf page 206 share the same layout, storing key-value pairs in sorted order and allowing efficient lookups. In the Bf-Tree 104, the mini-page and leaf page share the same implementation, except that mini-pages can have varying lengths. This significantly reduces the complexity of the system and allows optimizations to be implemented once and to apply them to both mini-pages and leaf pages.

Figure 3:
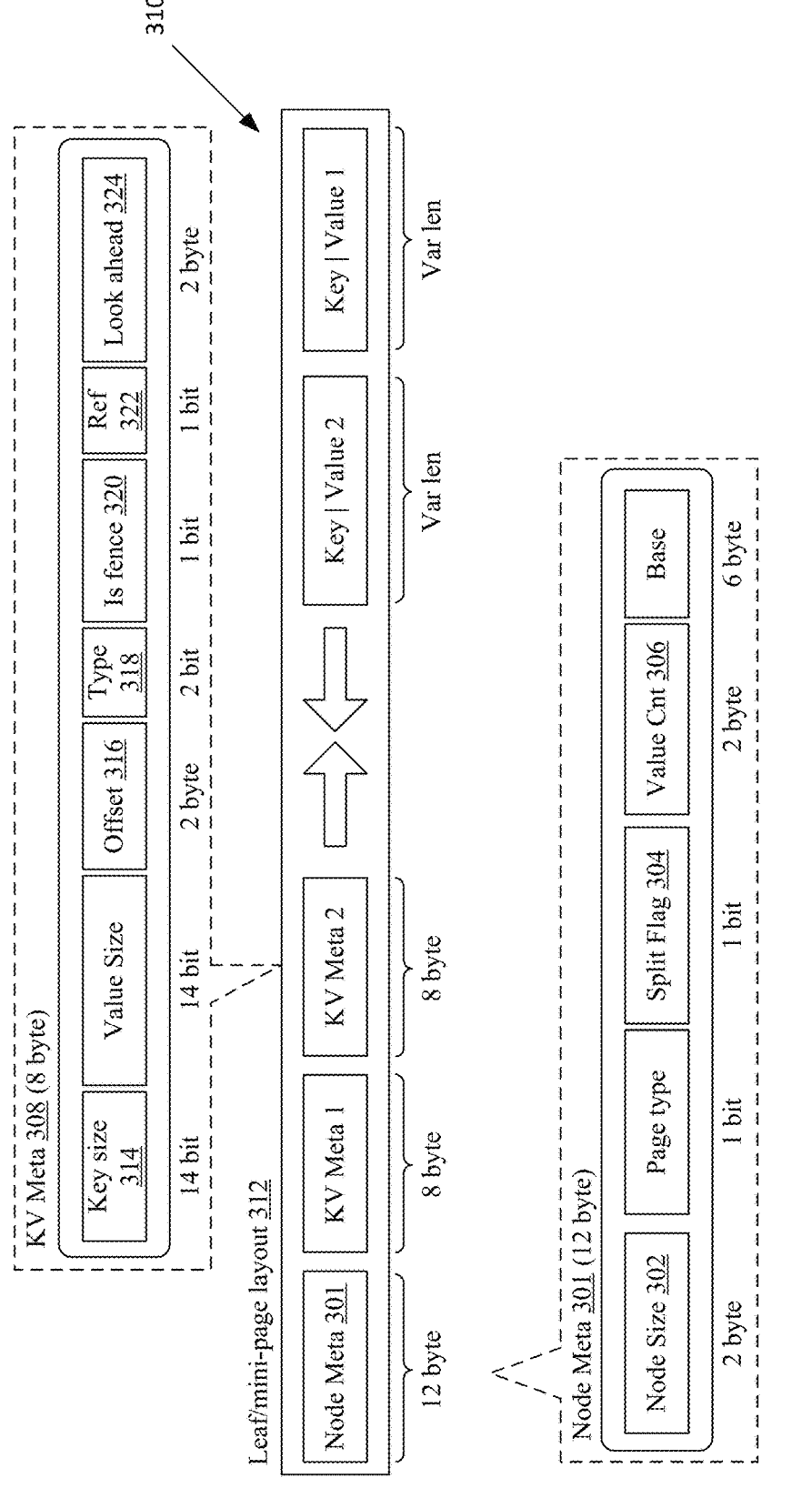
FIG. 3 is an example schematic diagram of both a mini-page and leaf node layouts.

Referring now to FIGS. 2 and 3 collectively, the page layout 300 starts with a 12-byte Node Meta 301, which encodes the node size 302, page type (mini or leaf page), split flag (whether the page is full) 304, and value count (the number of records on the page) 306.

The Node Meta 301 is followed by an array of KV (Key Value) Meta 308, which stores the metadata of the key-value pair 310. The metadata and key-value data are stored separately to support variable-length keys and values. The KV Meta 308 is stored from the beginning of the mini-page, and the actual key-value data is stored from the end of the mini-page. The node is full when the KV Meta and the key-value data meet in the middle as illustrated by the opposing arrows on the mini-page layout 312. Separating the metadata and the actual data also allows efficient insertion, as the engine 102 only needs to shift the metadata when inserting a new record instead of shifting the entire node.

Each KV Meta is 8 bytes and stores the length of the key 314 and value and the offset 316 of the key and value in the page. It also stores the type 318 of the key and value (more detail in Table 1), whether the key is a fence key 320, the reference flag 322 of the key-value pair, and the look-ahead 324 bytes of the key, each of which is described in greater detail infra. The key-value data is stored sequentially on the mini-page, starting at the specified offset in the KV Meta.

Leaf pages are stored on disk in data storage 106 and may have one or more associated mini-page(s) in memory 326. To locate the leaf page and its mini-page, the last level inner node stores a page ID, which references a mini-page or a leaf page. Bf-Tree 104 maintains a mapping table 208 that maps the page ID to the actual location. If the page ID points to a mini-page, its leaf page address can be found in the leaf field of the page header.

The mapping table 208 is an in-memory container that maps the logical page ID to the physical location of the page (i.e., memory address or disk offset). The mapping table 208 can be implemented using a hash table/indirection array, relying on the OS's page table, or using pointer swizzling. The Bf-Tree 104 uses an indirection array for its simplicity and performance. However, the Bf-Tree 104 can work with any of the above approaches, as the mapping table 208 can be decoupled from the rest of the engine 102.

In addition to the address translation, the mapping table 208 stores a reader-writer lock for each page. The reader-writer lock (16 bits) is co-located with the page address (48 bits); they are together packed into a 64-bit word for efficiency. As the mini-page and its leaf page share the same page ID, locking the mini-page will also lock the leaf page, simplifying the locking mechanism and reducing overhead.

Conventional B-Tree systems treat inner nodes and leaf nodes indistinguishably and use the same mapping table to translate an inner node page ID to a physical address. This creates a high overhead of inner node access (due to translation) and a contention hotspot on the mapping table 208. Inner nodes of B-Tree systems usually take less than 1% of the total B-Tree size, and they are much more frequently accessed than leaf pages (e.g., every leaf page access will involve multiple inner node accesses).

The Bf-Tree 104 instead pins the inner nodes 202 in memory and uses direct pointer addresses to reference them. This allows a simpler inner node implementation, efficient node access, and reduced contention on the mapping table. As inner nodes 202 are pinned to memory, the buffer pool 108 only needs to cache leaf pages.

Inner nodes 202 (especially root nodes) are often contention hotspots, as the inner nodes are on the path to leaf nodes, which store the actual data. While highly contended, inner nodes are rarely modified, as they are only modified when a leaf node splits or merges. Specifically, the system uses an 8-byte version lock to track the state of the inner node 202. A read operation can first read the version lock and search for the keys to reach the child node. After acquiring the lock of its child node, the read operation can check the version of the current node again to ensure that the version has not changed. If it has changed, the read operation can restart from the root node. A write operation can acquire an exclusive lock on the inner node and bump the version lock after the modification. Optimistic latch coupling for inner nodes allows Bf-Tree 104 to scale to high concurrency, as the read operation does not pollute cache lines, thus avoiding cache coherence traffic.

In some instances, performance optimizations can be made to the Bf-Tree's node layout, which applies to inner nodes 202, leaf nodes/pages 206, and mini-pages 204. For example, fence keys can be used to inform the key range of a node and are used to quickly determine the neighbor nodes for range queries. Each node has two fence keys, low and high fence keys. The low fence points to the left neighbor of the node, and the high fence points to the right neighbor. Alternative approaches are possible, e.g., chained pointers.

Keys of the Bf-Tree can have long prefixes, e.g., URL keys and names. To reduce memory usage and accelerate the key search, the Bf-Tree implements prefix compression based on the fence keys. The prefix of the node is implicitly stored in the fence keys and includes the key range of the node (i.e., the common prefix of the low and high fence keys is the prefix of the node). When inserting records into a node, the common prefix is skipped, and only the suffix is stored in the node; this reduces space consumption and allows higher fan out. To read the full key, the key's prefix and suffix can be assembled and stored in the node.

FIG. 3 illustrates that the Bf-Tree stores the KV pair's metadata and actual data apart from one another. While this design has benefits as mentioned earlier, it can incur higher random memory access. Specifically, when binary searching the page, the corresponding metadata can be loaded and then used to load the actual data. This two-step pointer chasing can be expensive. To accelerate the search, the first 2 bytes of the actual key are stored (called look-ahead bytes) in the metadata and these look-ahead bytes can be compared first. If the first 2 bytes match, the full key can be loaded from the data region. This process is especially efficient with prefix compression, as the first 2 bytes are likely to be different, and the search can be terminated early without loading the full keys.

Figure 4:
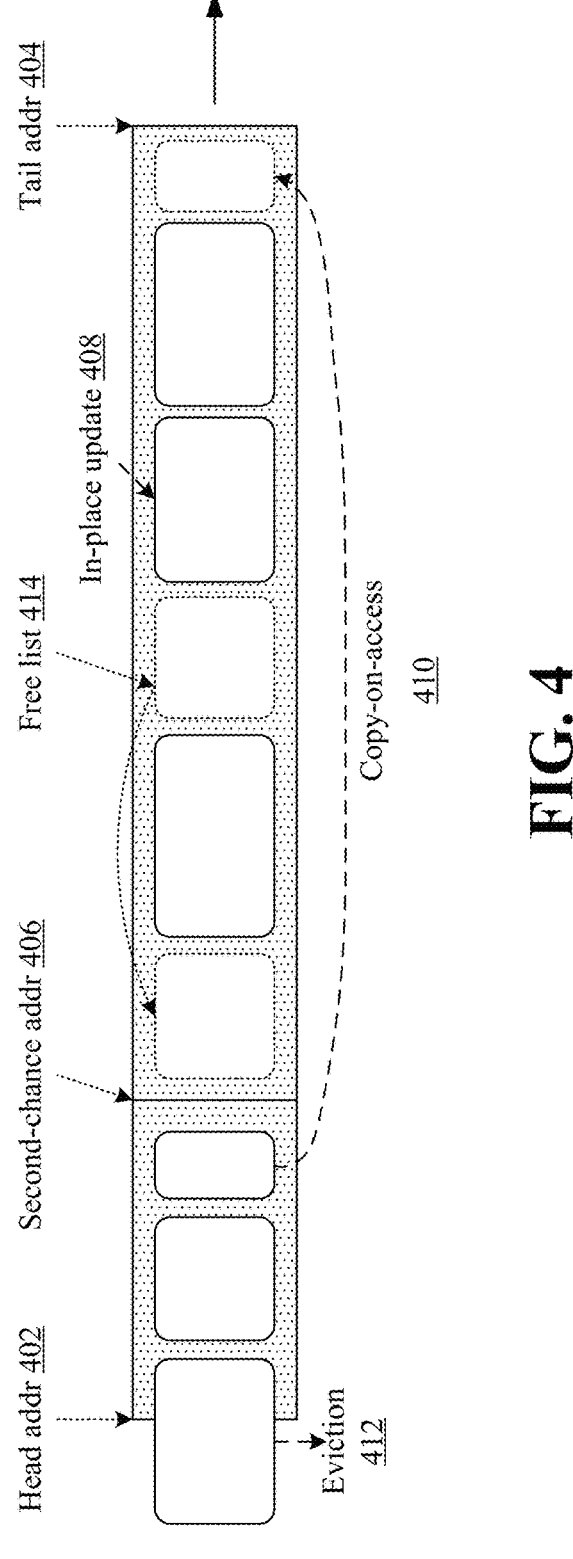
FIG. 4 is a schematic diagram of an example circular buffer.

Referring now to FIG. 4, as has been described, mini-pages can significantly reshape the design of a B-Tree, and how a Bf-Tree leverages mini-pages to achieve its efficiency goals. The following paragraphs describe how to manage the memory of mini-pages, as mini-pages can be of different sizes and can grow and shrink dynamically.

The variable-length buffer pool 108 has several considerations, namely the management of the memory of all mini-pages, i.e., the exact memory location of each mini-page, tracking the hotness of each mini-page and the evicting of cold mini-pages when needed, as well as solving the concurrency challenge of evicting and allocating by many threads while maintaining memory safety and parallelism.

The first challenge or technical problem pertains to memory fragmentation. When a large chunk of continuous memory is broken into smaller chunks of variable sizes, it can be difficult to assemble the chunks back to form a large chunk. The second challenge or technical problem is to systematically decide which mini-page should be evicted and which should be kept in memory. The third challenge or technical problem is safely issuing enough parallel I/O requests to saturate SSD bandwidth.

The engine 102 solves the technical problems above with a technical solution that implements a circular buffer to manage all the mini-pages. The system can store the mini-pages in the circular buffer 400, adding to the tail until the buffer is full. When it is full, the mini-pages close to the head address are evicted to disk, allowing the tail address to advance.

As shown in FIG. 4, the circular buffer has three addresses: a head address 402, a tail address 404, and a second-chance address 406. These three addresses divide the memory into 90% in-place-update region 408 (between the tail address and second-chance address) and 10% copy-on-access region 410 (the rest). Mini-pages on the in-place-update region can be modified in place, while mini-pages on the copy-on-access region will be copied to the tail address on access as described below.

The circular buffer 400 has two regions to detect hot and cold mini-pages. The nature of the circular buffer 400 evicts 412 all mini-pages that reach the head address 402; this is undesirable behavior for hot mini-pages. To circumvent this, mini-pages accessed in the copy-on-access region can be moved to the tail address 404 to prevent hot mini-pages from reaching the head address and getting evicted.

The circular buffer 400 also maintains multiple free lists 414, each with a different size class, to track recently de-allocated memory. A mini-page de-allocation happens when a mini-page tries to grow or shrink. This involves first allocating a new mini-page, copying the content of the old mini-page to the new one, and finally de-allocating the old mini-page. The de-allocated memory is added to a free list 414 and reused for future allocation.

The circular buffer 400 provides a succinct yet efficient API (Application Programming Interface) to support various operations on mini-pages. Memory for a mini-page can be allocated from two places: the free list 414 of the requested size category and the tail address 404. When the free list has no memory, the circular buffer 400 can be allocated from the tail address 404 by advancing the tail address 404 by the requested size. When the circular buffer 400 is full, i.e., the physical locations of tail and head addresses are close to each other; the circular buffer returns an error. The caller will then call for eviction to make room for new allocations.

Eviction 412 is the process of making room for new allocations. Eviction starts from the mini-page closest to the head address 402. A callback function is invoked to merge dirty records in the mini-page to the leaf page on disk (see FIG. 1, 106). Then, the mapping table (see FIG. 2, 208) is updated to point to the leaf page, and the head address is advanced. Eviction may happen simultaneously from multiple threads (more below). De-allocation simply adds the memory region to the corresponding free list 414, for reuse during a future allocation.

Certain performance optimizations can be implemented. For example, memory fragmentation can be used as there is no paging concept in the circular buffer 400, i.e., mini-pages are allocated with no spaces between them. Each allocated mini-page has an 8-byte metadata that stores its size and state (e.g., ready or free-listed). The meta-data is stored right before the mini-page. This design minimizes fragmentation as mini-pages do not need to align to specific memory boundaries.

Without paging, each mini-page is only aligned to an 8-byte boundary; this means that some mini-pages may cross the physical 4 KB paging boundary, incurring additional page table lookup while accessing the mini-page. This is mitigated using the Huge Table provided by the Linux kernel, where the entire physical memory of the circular buffer is backed by huge pages of 2 MB or 1 GB, heavily reducing the likelihood of mini-pages crossing the page boundary.

Eviction ensures that cold mini-pages are evicted to disk (see FIG. 1, 106), making room for hotter mini-pages. Eviction bumps the head address 402 so that the tail address 404 can be advanced. This is a sequential operation because the head address 402 can only increase linearly. To parallelize the eviction process, the circular buffer 400 can allow each thread to start evicting a mini-page concurrently but require all threads to finish the eviction in order, i.e., the head address 402 can only be advanced when all threads have finished their eviction.

Figure 5:
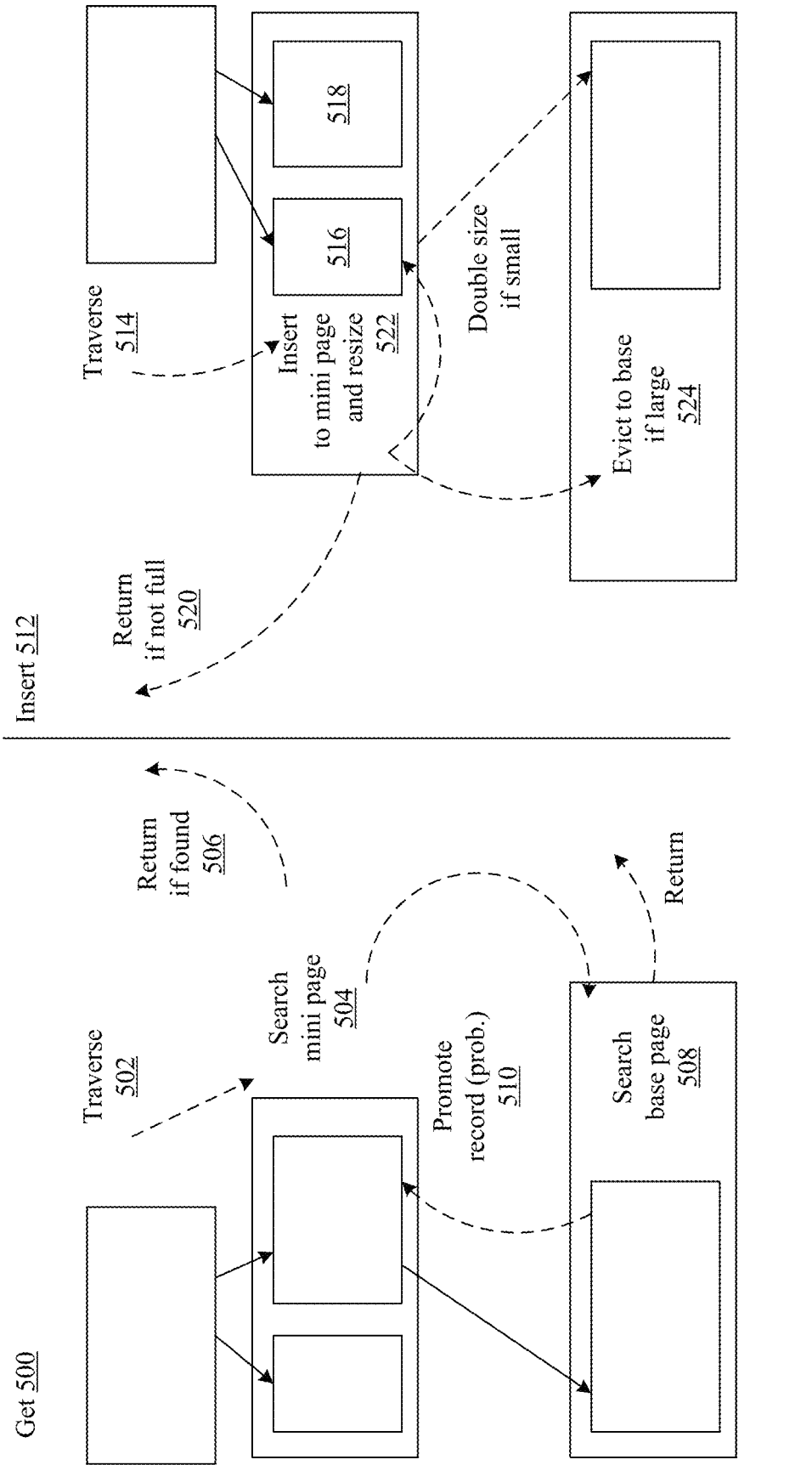
FIG. 5 is a logical flow diagram of GET and INSERT operations related to the circular buffer of FIG. 4.

FIG. 5 depicts how the Bf-Tree connects components to support efficient read, write, and range scans. A get operation 500 starts with traversing 502 the tree to the mini-page that may contain the target key-value pair and searching 504 the mini-page for the key. If the record is found in the mini-page (cached), the system will return 506 the record and terminate the operation early. If the record is not found (or no mini-page exists), the system searches the corresponding leaf page on disk, referred to as searching the base page 508. The leaf page can be loaded using the offset stored in the mini-page header (or the mapping table) and search the page for the target key-value pair. With a small probability (defaulting to 1%), the record can be cached by inserting or promoting 510 it into the mini-page, creating a new mini-page if one does not already exist. This allows subsequent searches for that record to be completed in memory. Algorithm 1 of FIG. 6 summarizes the get operation in pseudo-code.

Like the get operation, the insert operation 512 starts with traversing 514 the tree to the mini-page, creating a new mini-page 516 if it does not already exist. The size of the new mini-page is just enough to fit the new record so that a minimal write amplification is used on an existing mini-page 518. Then, an attempt to write the record into the mini-page is performed. If successful, i.e., the mini-page has enough space to absorb the record, the operation can be terminated early and no I/O (i.e., write to the leaf page) is needed in this case in step 520. If the mini-page is full, the mini-page can be resized to fit its current size in step 522. The resize process will allocate a new memory chunk and copy-initialize the mini-page to the new location. Once the mini-page is resized, this implementation inserts the record into the new mini-page. If the current mini-page is already large (e.g., 4 KB)—the mini-page has already absorbed enough records—the mini-page can be merged with the leaf page in step 524. The merging process will evict all dirty (modified) and cold records from the mini-page. Algorithm 2 of FIG. 7 summarizes the insert operation in pseudo-code.

In another optimization strategy, the system can perform a range scan. In general, the range scan involves scanning a range of records in the mini-page and leaf page and then merging the records to get the final result. This means the mini-page will not help reduce the I/O for the range scan because it needs to load the leaf page anyway. To mitigate this, the system allows a frequently scanned mini-page to grow to the full page size and cache the entire page in the circular buffer. Thus, the buffer pool can also behave as a page-level cache. Page-level caching fundamentally differs from record-level caching because it caches both individual records and entire range gaps. Caching the entire leaf page provides a simple way to handle not only efficient range scan but also gap locking, negative lookup, and so forth.

Deleting a record is essentially inserting a tombstone record into the mini-page. When a read operation reads the tombstone in the mini-page, it returns a not-found result without touching the leaf page. When the mini-page is merged to the leaf page, the tombstone record is removed from the leaf page, if it exists. Like delete, an update operation inserts the record into the mini-page. Future reads can directly read from the mini-page. The record is updated on the leaf page when the mini-page is merged.

The following paragraphs describe operations that pertain to mini-pages, and the first pertains to merging. There are two cases where a mini-page might be merged: (1) the mini-page is too large, and (2) the mini-page is cold. A mini-page grows in size to cache/buffer as many records as possible, but a mini-page cannot grow arbitrarily large, as records in the mini-page are sorted; a large mini-page incurs high insertion overhead. When a mini-page grows beyond 2 KB, the mini-page can be merged with the leaf page on disk to become a 4 KB mini-page that mirrors the leaf page. As discussed in supra, the mini-page can be evicted (merged to the leaf page) if it is not accessed while the mini-page is in the second-chance region.

To merge a mini-page with its leaf page the related leaf page can be located using the leaf page ID field in the mini-page header. Then, the space needed for the leaf page to accommodate the mini-page can be calculated; if the leaf page does not have enough space, the leaf page can be split in order to accommodate the contents of the mini-page. Then, the records of the mini-page can be inserted into the corresponding leaf pages. Once all records are merged into the leaf page, the mini-page can be discarded and the memory can be reused.

Mini-pages cache hot records, but hot records can become cold over time. The mini-page needs to evict cold records to make room for hotter records. To identify those cold records, the system can add one reference bit to each record in the mini-page. When a record is accessed, its reference bit is set to 1. When the eviction starts, the system can evict the records whose reference bit is 0 and set all other reference bits from 1 to 0. If a cold record is a cache record (read cache or phantom record), the cold record can be directly discarded without writing back to the leaf page. If the record is dirty (insert or tombstone), the entire mini-page is merged to the leaf page (maximizing the utility of the disk write), while retaining the hot records in the mini-page.

When a mini-page is accessed while it is in the second-chance region, it is copied to the tail address. This prevents a frequently accessed mini-page from reaching the head address, thus preventing it from being evicted to disk. A new memory chunk can be allocated from the circular buffer and copy the mini-page to the new location. The old address is marked as a tombstone, and eviction is not triggered. While copying a mini-page to tail, cold records can be removed from the mini-page, as discussed in the previous paragraph. This means that a record in the mini-page is evicted to disk if it is not accessed while it is in the in-place update region, and the entire mini-page is evicted to disk if it is not accessed while in the second-chance region.

In some instances, a leaf node splits into two nodes when it is full. For Bf-Tree, an insert attempts to insert to the mini-page first. Growing a mini-page beyond 4 KB triggers an eviction, followed by a split operation of the leaf page. When the split happens, each of the remaining records in the mini-page is compared with the split key to determine which leaf page it should get inserted into.

A common problem with existing record-caching systems is that they do not handle negative searches well. A negative search is an operation that tries to find a key-value pair that does not exist in the system. Existing record-caching systems only assert the existence of a key-value pair; if a record is not found in the cache, it either means the record is not cached or means the record does not exist. Those systems then need to look up the leaf page to confirm the existence of the record, which is inefficient.

To resolve this issue, the present implementations cache the negative search result by inserting a phantom record into the mini-page. The observation is that the negative record is like any frequently searched record; the record can be cached in the mini-page. Advanced techniques such as Bloom filters can improve the negativity test.

TABLE 1

| Record type | Dirty? | Existence? |
| --- | --- | --- |
| Insert | True | True |
| Cache | False | True |
| Tombstone | True | False |
| Phantom | False | False |

As noted in Table 1, four types of records can be present in a mini-page: insert, cache, tombstone, and phantom. Each of the types indicates the property of a record, and a dirty record can be written back to the leaf page when the mini-page is merged, and the existence tells whether a record exists in the system.

For optimal performance, the system employs extensive concurrency (hybrid optimistic and pessimistic latching), bare metal memory management (e.g., operating on raw pointers instead of high-level abstractions), and bit packing (e.g., packing metadata into smaller spaces to save memory).

In some instances, the system can validate the correctness of procedures. For example, fuzzing is a bug-finding technique that generates random inputs to the system and tests for crashes. The system employs fuzzing to generate random operation sequences (e.g., insert, read, scan) and check that none of the operation sequences will crash the system or lead to an inconsistent state.

In another example, property-based testing checks that a system behaves according to its specifications. In particular, the Bf-Tree index can semantically behave like any range index, e.g., a previously inserted record should be found in the future, and a deleted record should not be found in the future. A property-based testing can be used to check that the Bf-Tree index always acts like a chosen, baseline B-Tree. Like fuzzing, property-based testing generates random inputs to the Bf-Tree index and checks that consistent results are returned.

Concurrent systems are nondeterministic and subject to exponential amounts of different thread-interleaving. Shuttle can be used to deterministically and systematically explore different thread interleaving to uncover the bugs caused by subtle multithread interactions. In some instances, a pointer is only valid if the memory it points to is still alive (i.e., not de-allocated, still contains the relevant data). The Bf-Tree of the present technology can rely on a reference model, such as Rust, to statically check that all access to mini-pages is safe.

FIG. 8 is a flowchart of an example method of the present technology. The method can include a first step 802 of receiving a data operation request for a data item in a database. As noted above, the data operation request can be received from any end point such as an application, a computing device, or any other similar device or service.

Step 804 involves accessing a variable-length buffer pool. This buffer pool may contain several mini-pages. Notably, in one particular implementation, each mini-page within the buffer pool is capable of being dynamically adjusted in size. This adjustment is directly responsive to the requirements of the data operation request, allowing for flexible and efficient data management tailored to current operational demands.

The method includes step 806 of determining whether the data item is contained within an existing mini-page of the variable-length buffer pool. This step involves checking the presence of the data item within the already allocated mini-pages, which are dynamically adjustable in size to optimize storage efficiency and data retrieval speed.

If the data item is not contained within an existing mini-page, step 808 involves allocating a new mini-page within the variable-length buffer pool. The size of this new mini-page is determined based on the size of the data item and an attribute of the data operation, allowing for tailored data management that enhances performance and storage utilization.

The method includes step 810 of executing the data operation on a mini-page. When the data operation involves a write, the size of the mini-page is dynamically adjusted to accommodate the new data. This adjustment is made without requiring modifications to adjacent data structures, ensuring efficient data handling and minimizing the impact on the system's overall performance.

Step 812 involves updating a mapping table that correlates mini-page identifiers with their physical memory locations. This mapping ensures that each mini-page can be quickly and accurately located within the system for any subsequent operations.

In step 814, the data item is cached within the mini-page based on a frequency of access parameter. This mechanism ensures that frequently accessed data items are retained within mini-pages in memory, enhancing performance, while infrequently accessed data items are moved to disk storage to optimize memory usage.

The method concludes with step 816, which involves evicting a mini-page from memory to disk storage. This eviction is based on a caching policy that prioritizes the retention of mini-pages containing hot data items and the eviction of mini-pages containing cold data items, thereby maintaining efficient use of memory resources. Mini-pages can also be evicted when they reach a certain, predetermined size. That is, the mini-page can be evicted when it exceeds a page size threshold.

Experimental Use Case

A B-tree potentially is the most important range index for larger-than-memory data processing systems. It organizes data in pages that align well with block devices such as SSDs. This allows each disk IO (usually 4 KB) to load exactly one page of the B-Tree from the disk, and the entire page is used to narrow down the search space. While example sizes have been given for the mini-pages ranging from 64B to 4K, it will be understood that a mini-page's max page size may in theory be larger than the disk leaf-page size. For example, a disk leaf-page size may be 4K, whereas the mini-page size may grow to 8K or 16K or beyond. The reason for this is that in combination with the possible range gap knowledge (all values in a given range are present in the mini-page), the system can optimize for large scan operations by scanning the single large mini-page. The minimum page size of the mini-page can depend on the size of the cache line in the main memory.

However, a B-Tree is not a silver bullet for all workloads, as it faces two key challenges: (1) it incurs high write amplification: a small modification to a page requires the system to write the entire page back to disk and (2) its native caching strategy is inefficient, as it caches data in memory at a page granularity, even if only a small subset of records on the page are hot. These problems are exacerbated when a B-Tree is used as a secondary index with small keys and values.

Many solutions have been proposed to mitigate these problems. LSM-Trees are the most notable alternative; they use log-structured writes (appends) to mitigate write amplification problems but incur a higher cost for read and compaction. Many studies have proposed to enhance the B-Tree itself, e.g., Bw-Tree and BE-Tree employs delta records to reduce write amplification by chaining updates and batch writing them. Two-Tree, Anti-Caching, Siberia, and TreeLine employ a separate record cache to improve caching efficiency.

These enhancements, however, are complex and introduce new challenges. For example, delta records improve write amplification but slow down read and scan operations: as a page's chain gets longer, it incurs excessive random memory access. A record cache allows efficient point lookup but does not apply to range scans, leaving a smaller memory budget for caching scan records. They are also hard to maintain consistently and tune for memory usage relative to the page cache. Overall, modern B-Trees require a holistic re-design to address the aforementioned challenges and better optimize for both read and write operations.

Interestingly, the root cause of both problems comes from the core B-Tree design principle of page-based data organization: records of a page are coupled together and are transferred between memory and disk as a whole. The fundamental tension is that the disk page size is much larger than the record size, and such a coarse-grained data management limits performance.

One salient feature is the ability of the system to separate cache pages from disk pages, i.e., the cache pages are no longer a mirror of their disk content. Instead, they contain a judiciously chosen subset of the disk page that is worth caching. Called mini-pages, these cached pages are a native part of the tree's memory component and can be both read from and written consistently. Mini-pages provide a technical solution by having the freedom to cache individual hot records, a key range, the original page, and/or serve as a succinct buffer for recent updates. This design leads to more efficient point lookup, range scan, and write operations.

The Bf-Tree is a modern B-Tree built from the ground up using Rust, characterized by a new variable-length in-memory buffer pool to store mini-pages. Mini-pages serve three purposes: (1) cache frequently accessed records, (2) buffer recent updates, and (3) cache a range gap (a range between two keys). This is made possible by changing the mini-page size dynamically: it can grow larger to accommodate more updates and cache more records. It may even grow to the full-page size (4 KB) to allow efficient cross-node range scans. It can also shrink to allow other mini-pages to grow.

Variable-length mini-pages are ideal for addressing the above problems, but memory management of mini-pages faces challenges of memory alignment, fragmentation, and resource utilization. Specifically, the variable-length buffer pool that serves mini-pages may satisfy the following four requirements: (1) constrain the memory consumption of mini-pages to a configured value; (2) manage and track used/unused memory, i.e., allocate and de-allocate mini-pages; (3) identify hot and cold mini-pages: grow hot mini-pages while shrink or evict cold mini-pages. (4) interact with the on-disk leaf pages to ensure consistency and data integrity. Further, all these requirements may be handled efficiently in a multi-threaded (concurrent) setting.

To this end, the present implementations provide a novel variable-length buffer pool built upon a circular buffer. The circular buffer has a fixed total size, and all mini-pages are stored in the circular buffer. Allocation of mini-pages is done by advancing the tail pointer of the circular buffer, while deallocation is done by adding the memory region to a free list, which will be reused for future allocation. Growing and shrinking mini-pages is done by allocating a new mini-page and copying the content of the old mini-page to the new one as a read-copy-update. When the circular buffer is full, the mini-pages close to the head pointer will be evicted to disk, making room for new mini-page allocation.

Figure 9:
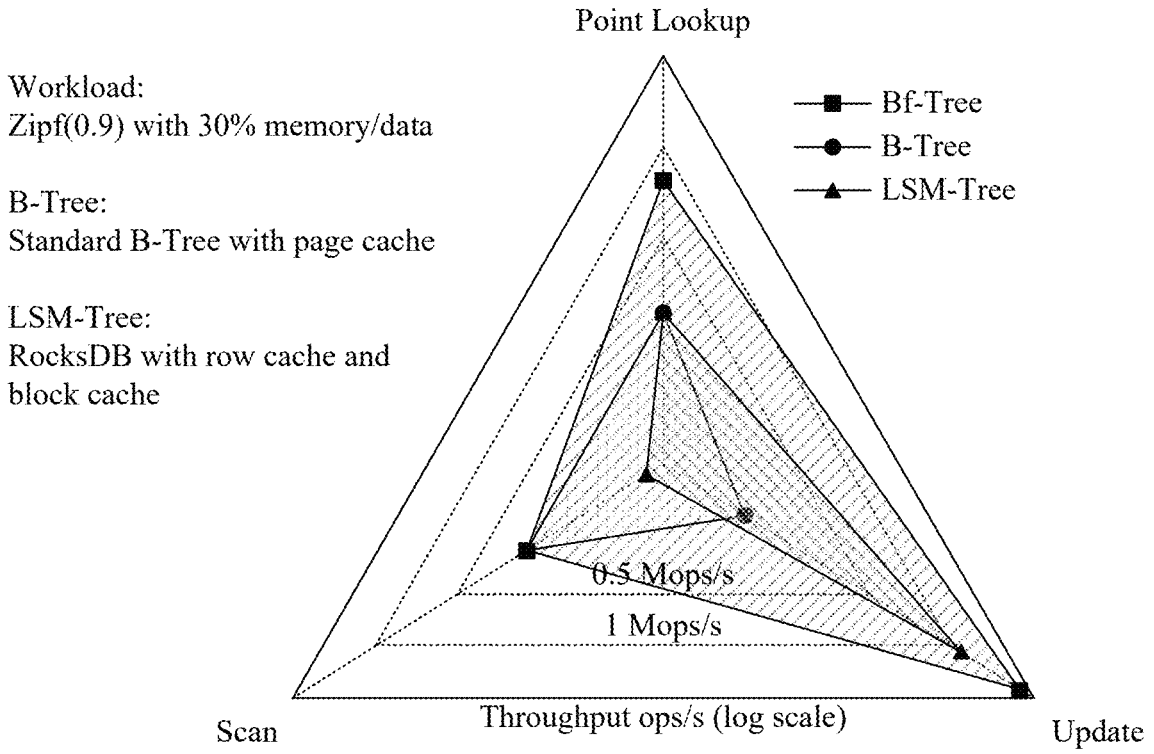
FIG. 9 illustrates evaluations where Bf-Tree with mini-pages has high cache efficiency and low write-amplification in a YCSB-like benchmark for all point lookup, scan, and write operations.

FIG. 9 illustrates evaluations where Bf-Tree with mini-pages has high cache efficiency and low write-amplification in a YCSB-like benchmark for all point lookup, scan, and write operations. Specifically, Bf-Tree has 2.5× higher throughput than RocksDB (LSM-Tree) for scan operations, 6× faster than a B-Tree for write operations, and 2× faster than both B-Trees and LSM-Trees for point lookup.

The Bf-Tree represents a significant advancement in database technology, employing variable-length buffer pools and mini-pages to enhance traditional B-Tree architectures. This section of the disclosure is dedicated to evaluating the performance of the Bf-Tree in comparison with contemporary key-value storage systems. The evaluation specifically addresses several critical performance metrics: comparison of Bf-Tree performance against established databases such as RocksDB, traditional B-Tree implementations, their modern variants, and Leanstore across various workload conditions; analysis of Bf-Tree's performance under different workload intensities, levels of contention, and varying cache sizes; and examination of the allocation of processing time across the different components of Bf-Tree.

The findings from the performance evaluation indicate that the Bf-Tree significantly outperforms competing technologies in several key operations. Notably, the Bf-Tree achieves a performance improvement of approximately 2.5 times that of RocksDB (an LSM-Tree implementation) for scan operations. Additionally, it is six times more efficient than traditional B-Trees for write operations and twice as effective as both B-Trees and LSM-Trees for point lookups. These results substantiate the Bf-Tree's superior performance and efficiency in handling diverse database operations.

To assess the performance of the Bf-Tree, a comprehensive benchmark was conducted using a YCSB-like protocol with an initial dataset comprising 100 million records, each 32 bytes in length, split evenly between a 16-byte key and a 16-byte value. The data distribution adhered to a Zipfian model with a skew factor of 0.9, where 80% of requests accessed 33% of the records. Further details on additional distributions are set forth below. The default workload consisted of an equal mix of read and write operations, with the system utilizing a standard memory allocation of 1 GB. The system was warmed up until throughput stabilized, followed by five benchmark iterations to determine optimal performance metrics.

The Bf-Tree was implemented in Rust, encompassing approximately 10,000 lines of code. For optimized input/output operations, the system utilized the latest io_uring features of the Linux kernel, specifically employing kernel polling mode to enable direct I/O operations with zero system calls. The benchmark testing was performed on a CloudLab machine designated 'sm110p,' equipped with 32 hyper-threads at 2.4 GHZ, 128 GB of memory, and a 1 TB NVMe PCIe 4.0 SSD capable of exceeding 600,000 IOPS. The operating system used was Ubuntu 22.04 with kernel version 5.15 and the ext4 file system.

The evaluation of Bf-Tree includes comparisons with several key-value storage systems, namely RocksDB, Bδ-Tree, a conventional B-Tree, and Leanstore. These baselines are selected to represent a variety of caching and storage strategies currently prominent in the industry.

RocksDB, a state-of-the-art LSM-tree-based key-value store widely adopted in production environments, optimizes both read and write operations. It employs a three-tier caching mechanism consisting of a memtable for initial write absorption, a block cache for storing stable blocks, and a row cache for caching individual records. Users have the flexibility to allocate memory across these caches, typically balancing between read and write operations. To enhance performance, configurations such as direct IO and disabled fsync are often employed.

The conventional B-Tree implemented for this study shares the same Rust codebase as Bf-Tree, adopting all its optimizations except for the mini-page design, thus maintaining page-level caching. This provides a baseline to understand the enhancements introduced by Bf-Tree's mini-page architecture.

Bδ-Tree, designed to explore the benefits of delta records like those used in Bw-Tree and BE-Tree systems, incorporates all Bf-Tree optimizations except the mini-page design. It integrates delta records and page caches into a single circular buffer to manage memory more efficiently, reflecting a close design comparison to the Bw-Tree used in production settings.

Leanstore, known for its efficient pointer swizzling and optimization for both in-memory and larger-than-memory workloads, serves to compare the overhead reduction in mapping tables against the caching efficiency improvements in Bf-Tree. The inclusion of Leanstore helps affirm the competitive in-memory performance of Bf-Tree.

These comparisons highlight the distinct advantages of the Bf-Tree architecture, especially in handling modern database management challenges.

Figure 10:
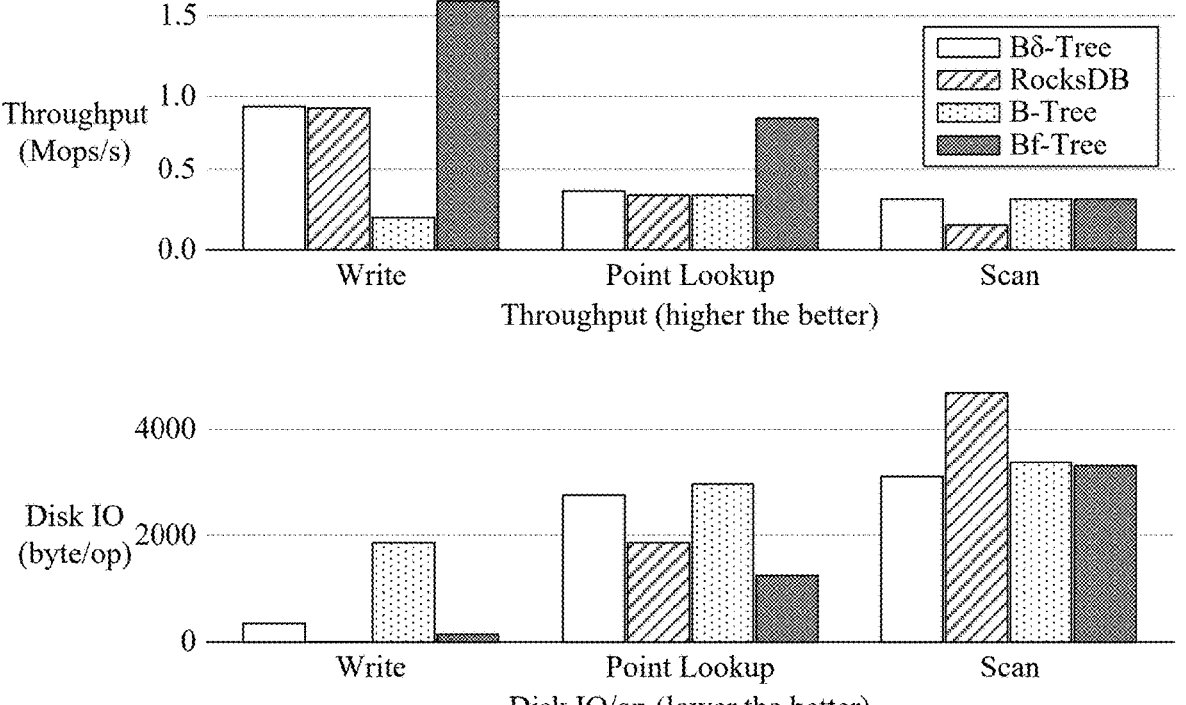
FIG. 10 illustrates the comparative performance of Bf-Tree against key baselines RocksDB, Bδ-Tree, and a conventional B-Tree across three critical workloads: point lookup, write, and scan.

FIG. 10 illustrates the comparative performance of Bf-Tree against key baselines—RocksDB, Bδ-Tree, and a conventional B-Tree—across three critical workloads: point lookup, write, and scan. The throughput and disk IO per operation for each system is evaluated under the default benchmark setup.

In the write workload scenario, the conventional B-Tree is less efficient, typically requiring a full page write for each record update, which results in the highest disk IO per operation. Conversely, Bf-Tree, Bδ-Tree, and RocksDB utilize write buffers that aggregate write operations, significantly reducing disk IO. Bf-Tree outperforms Bδ-Tree due to its capability to handle larger mini-pages, thus delaying the need to write to disk. Bδ-Tree, while having a high disk IO, maintains performance comparable to RocksDB through effective in-memory data structures and efficient IO management, such as zero-copy IO.

The point lookup tests reveal Bf-Tree's superior performance through its use of record-level caching within mini-pages, enhancing its ability to quickly identify hot records. Bδ-Tree and conventional B-Tree employ page-level caching, resulting in comparable throughput and disk IO to each other. RocksDB, while benefiting from row cache efficiency, shows throughput comparable to B-Tree systems due to the lesser efficiency of its in-memory skip list.

During range scans, all B-Tree-based systems, including Bf-Tree, Bδ-Tree, and the conventional B-Tree, show similar performance as they cache full leaf pages in memory, which helps maintain record locality and optimize scan operations. RocksDB lags in this area because it requires scanning across all levels of its storage tables and merging them, which increases its disk IO usage.

Overall, this testing demonstrates Bf-Tree's robust performance across all tested workloads, highlighting its suitability as a versatile key-value store capable of handling diverse operational demands effectively.

Figure 11:
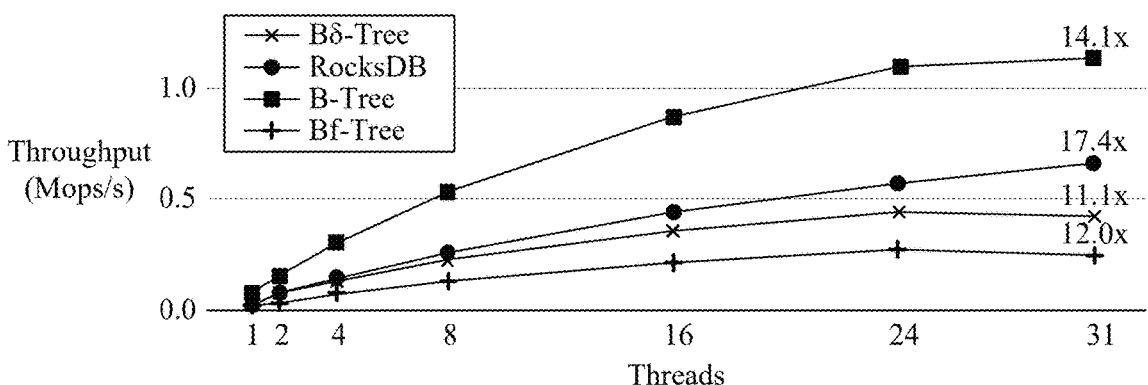
FIG. 11 highlights the scalability of Bf-Tree in comparison with other baseline systems such as RocksDB, Bδ-Tree, and a conventional B-Tree under a mixed workload of 50% reads and 50% updates, as detailed above.

FIG. 11 highlights the scalability of Bf-Tree in comparison with other baseline systems such as RocksDB, Bδ-Tree, and a conventional B-Tree under a mixed workload of 50% reads and 50% updates, as detailed above. The scalability test varies the number of threads to assess each system's ability to handle increasing loads without saturating the SSD bandwidth.

All evaluated systems demonstrate good scalability before the maximum disk bandwidth is reached. Bf-Tree outperforms the others with the lowest write amplification and most effective caching techniques, which are enhanced by its io-uring-based IO operations. These features allow Bf-Tree to scale efficiently without the typical bottlenecks associated with kernel overhead.

RocksDB, while achieving the highest scale factor of 17.4×, does not saturate the disk bandwidth at 31 threads, suggesting less efficient IO handling compared to other systems. Bf-Tree, Bδ-Tree, and the conventional B-Tree reach the disk bandwidth limit at 31 threads, with scale factors of 14.1×, 11.1×, and 12.0×, respectively. Notably, Bδ-Tree's performance is lower than RocksDB due to its lack of fine-grained caching like RocksDB's row cache. The conventional B-Tree exhibits the least scalability, hampered by its page-level caching strategy that leads to significant write amplification.

Figure 12:
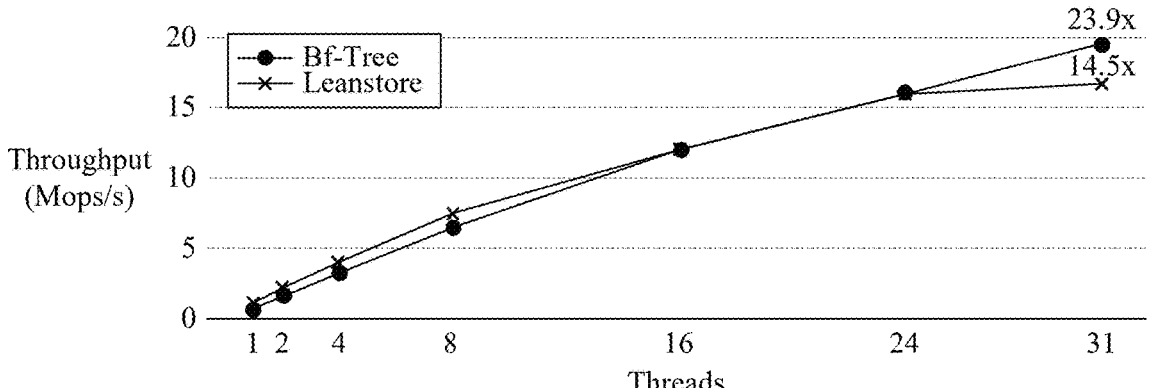
FIG. 12 provides an in-depth comparison of in-memory performance between Bf-Tree, B-Tree, Bδ-Tree, and Lean-Store, ensuring data fits within memory limits.

FIG. 12 provides an in-depth comparison of in-memory performance between Bf-Tree, B-Tree, Bδ-Tree, and Leanstore, ensuring data fits within memory limits. This setup, under the same workload conditions detailed in previous sections, evaluates the efficiency of each system when no disk IO is necessary.

Bf-Tree, B-Tree, and Bδ-Tree converge in design under these conditions, highlighting their core architectural similarities. The test includes Leanstore, a sophisticated B-Tree variant optimized for in-memory operations that employs pointer swizzling to minimize mapping table overhead, offering a useful contrast to Bf-Tree's approach. The inclusion of Leanstore serves as a control to ensure Bf-Tree's mini-page design does not degrade its in-memory performance.

In scenarios with lower thread counts, Leanstore slightly outperforms Bf-Tree due to reduced overhead from mapping table interactions, potentially resulting in fewer cache misses per operation. However, as the thread count increases, Bf-Tree demonstrates superior performance, achieving a scale factor of 23.9× compared to Leanstore's 14.5×. This indicates Bf-Tree's enhanced ability to manage contention effectively.

While both systems perform comparably in in-memory contexts, Bf-Tree excels in larger-than-memory workloads through its advanced record-level caching and reduced write amplification. This juxtaposition underscores Bf-Tree's versatility and robustness as a general-purpose key-value store suitable for diverse operational scales.

Figure 13:
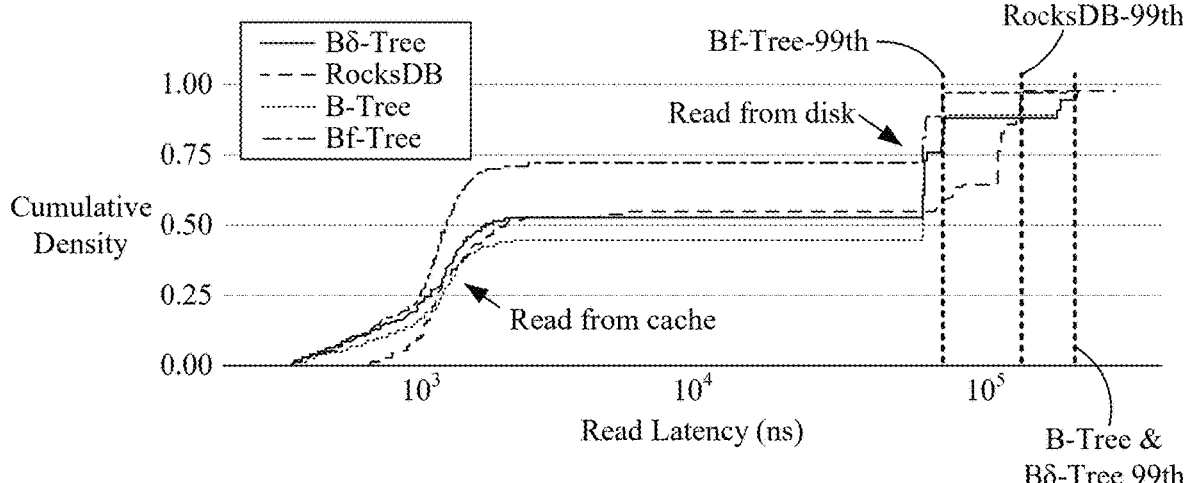
FIG. 13 outlines the latency distribution comparison between Bf-Tree and other baseline systems, focusing on a read-only workload executed on a single thread.

FIG. 13 outlines the latency distribution comparison between Bf-Tree and other baseline systems, focusing on a read-only workload executed on a single thread. The graph plots latency in nanoseconds against the cumulative distribution from 0% to 100%, marking the systems' 99th-percentile tail latency with dashed vertical lines.

The results depict a distinct two-stage latency pattern for all systems. In scenarios where data is cached in memory, latencies hover around 1 microsecond. Conversely, accessing data from disk drives latencies up by a factor of 100, roughly translating to about 100 microseconds. Bf-Tree leverages its variable length mini-pages to significantly enhance its caching efficiency, achieving a cache ratio close to 75%. This superior caching capability allows Bf-Tree to maintain the lowest 50th-percentile latency at 1.18 microseconds.

Comparatively, Bδ-Tree, RocksDB, and B-Tree exhibit higher 50th percentile latencies of 1.61 microseconds, 1.86 microseconds, and a notably slower 58.7 microseconds, respectively. For data volumes exceeding memory capacities, Bf-Tree continues to outperform with the lowest 99th percentile latency at 70 microseconds, nearly half that of RocksDB at 131 microseconds. This efficiency is attributed to Bf-Tree's innovative IO approach, which eliminates the need for copy operations and system calls, streamlining data handling even under demanding conditions.

Figure 14:
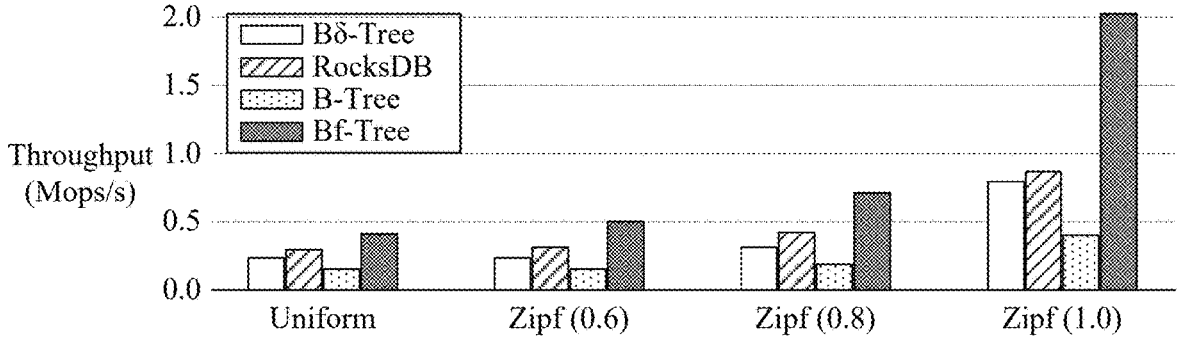
FIG. 14 illustrates the impact of workload skewness on system performance, tracking how different systems manage from a uniform distribution to a Zipf distribution with a skew factor of 1.0.

FIG. 14 illustrates the impact of workload skewness on system performance, tracking how different systems manage from a uniform distribution to a Zipf distribution with a skew factor of 1.0. The analysis reveals that all systems improve performance as the skew increases because hot records are more likely to be cached, reducing access times. Bf-Tree excels consistently across all levels of skew, particularly distinguishing itself under high skew conditions. This performance advantage is largely due to its effective record-level caching, which is more adept at identifying and caching hot records compared to the page-level caching mechanisms employed by traditional B-Trees.

In contrast, RocksDB, despite having a row cache, splits its memory allocation across memtable, block cache, and row cache, which diminishes its overall caching efficiency. Bδ-Tree encounters similar challenges; its delta chains and page cache compete for memory, reducing its caching effectiveness. Bf-Tree's design allows it to utilize the entire memory allocation for record caching, avoiding these divisions and inefficiencies.

Under uniform distribution conditions, where all records are equally likely to be accessed, caching benefits diminish across all systems. However, Bf-Tree maintains superior performance due to its mini-page architecture, which dynamically adjusts to the actual number of records, mitigating the internal fragmentation common in traditional B-Tree leaf pages. Traditional leaf pages typically use only about 70% of the allocated space because of page splitting, leading to memory wastage when the entire page is cached. Bf-Tree's adaptable mini-pages enhance memory utilization by expanding or contracting to fit the precise data volume, ensuring more efficient use of available memory.

Figure 15:
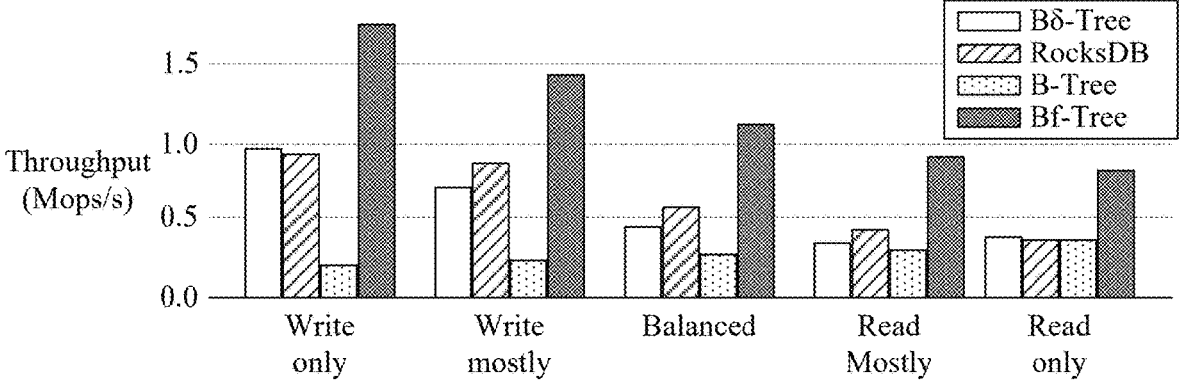
FIG. 15 illustrates the differential impact of read and write workloads on Bf-Tree and various baseline systems.

FIG. 15 illustrates the differential impact of read and write workloads on Bf-Tree and various baseline systems. Systems utilizing buffered writing techniques, such as Bf-Tree, Bδ-Tree, and RocksDB, show enhanced throughput with increased write operations due to their ability to buffer these operations in memory. These buffered writes are only committed to disk once the buffer reaches capacity. Conversely, read operations result in direct disk access for each cache miss, impacting performance.

Conventional B-Trees perform better with a higher ratio of read operations because each read typically involves only a single disk I/O, whereas write operations may require both read and write disk I/Os to complete. This dynamic changes in Bf-Tree, which outperforms other systems under varying read and write conditions. The mini-page design of Bf-Tree allows it to effectively cache individual hot records and efficiently handle write operations within the buffer. This capability enables Bf-Tree to achieve superior performance across all combinations of read and write workloads, demonstrating its robust adaptability and efficiency in managing diverse operational demands.

Figure 16:
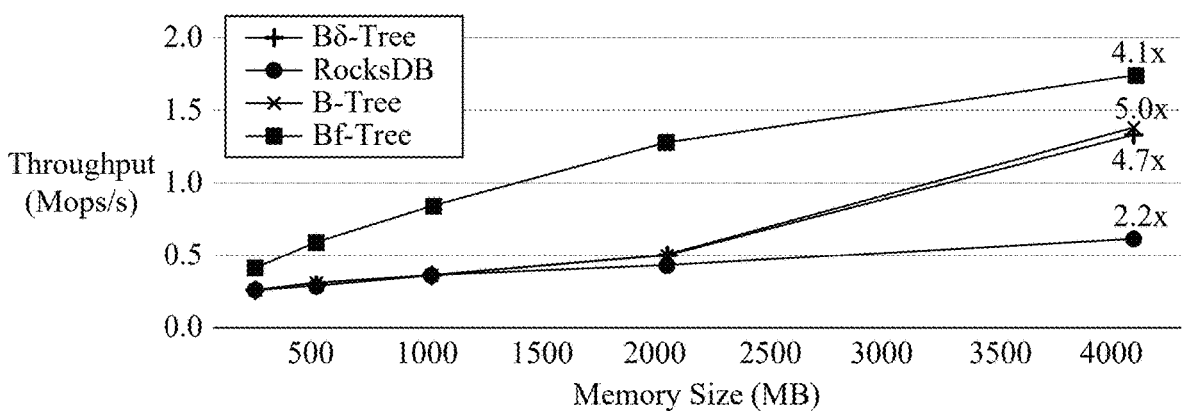
FIG. 16 details an investigation into the cache sensitivity of Bf-Tree compared to baseline systems under a read-only workload with memory sizes ranging from 256 MB to 4 GB.

FIG. 16 details an investigation into the cache sensitivity of Bf-Tree compared to baseline systems under a read-only workload with memory sizes ranging from 256 MB to 4 GB. The study tracks how throughput evolves as cache size increases. Notably, while RocksDB exhibits a moderate performance boost, peaking at a 2.2-fold increase, it demonstrates relatively low caching efficiency. In contrast, Bδ-Tree and B-Tree, which both utilize page-level caching, show more substantial improvements of 4.7-fold and 5.0-fold, respectively. These systems experience slower performance gains when the majority of data resides on disk, but faster increases when more data is held in memory.

Bf-Tree, employing a distinct caching strategy, achieves a consistent performance increase of approximately 4.1-fold across all tested memory sizes, outperforming the baseline systems, especially when most data are stored on disk, highlighting its superior caching capabilities. However, as data fully resides in memory, the performance differences narrow due to all B-Tree-based systems converging in design to optimize in-memory operations. This pattern underscores Bf-Tree's effective use of its innovative caching mechanisms under various memory conditions.

Figure 17:
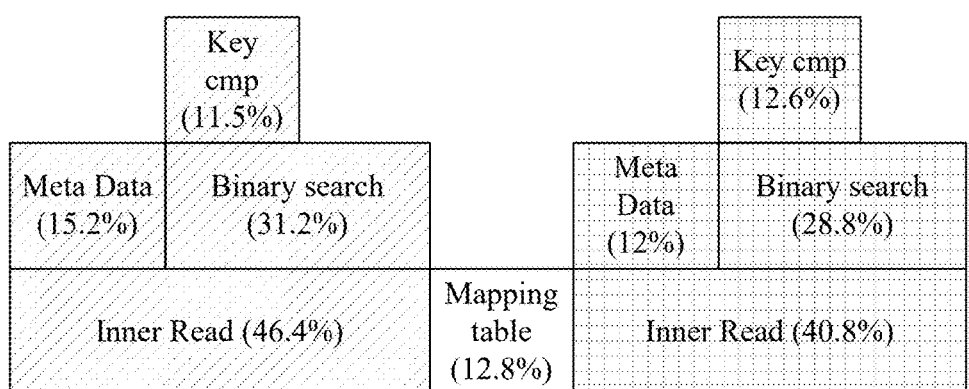
FIG. 17 illustrates the time allocation across different components of the Bf-Tree system, providing a breakdown of operations such as inner node traversal, mapping table locking and lookup, and leaf node lookup, specifically for an in-memory read-only workload.

FIG. 17 illustrates the time allocation across different components of the Bf-Tree system, providing a breakdown of operations such as inner node traversal, mapping table locking and lookup, and leaf node lookup, specifically for an in-memory read-only workload. In scenarios where the workload exceeds the memory capacity, the majority of the processing time, over 95%, is dedicated to disk IO, with the remaining time distributed among the aforementioned components, similar to the in-memory workload.

The operation of Bf-Tree involves multiple inner node traversals to navigate through the tree, followed by a mapping table lookup and a leaf node search. During inner node traversal, the system first retrieves metadata for key-value pairs, performs a binary search to locate the next node pointer, and then accesses the subsequent node. Mapping table operations include calculating the location of a mapping table slot using the page ID, loading the mapping table, acquiring a lock, and then using the retrieved physical address to access the corresponding leaf page. The search process for leaf pages mirrors that of inner node traversal, focusing on similar metadata and search techniques.

The analysis depicted suggests that even though multiple inner nodes may be read during a single operation, the time spent on these reads approximates the time taken to search a single leaf node. This efficiency is attributed to the frequent access and caching of inner nodes within the CPU's cache, which contrasts with leaf nodes that are accessed less frequently and generally require retrieval from memory. The mapping table's involvement accounts for only 12.8% of the total processing time, as it primarily necessitates a single memory access for both address translation and lock acquisition. Both inner and leaf node searches share a comparable allocation of time to metadata loading and binary searching, streamlined by uniform page layouts and optimizations. During binary searches, a significant portion of the time is dedicated to comparing key bytes, with the remainder focused on data retrieval from memory.

Figure 18:
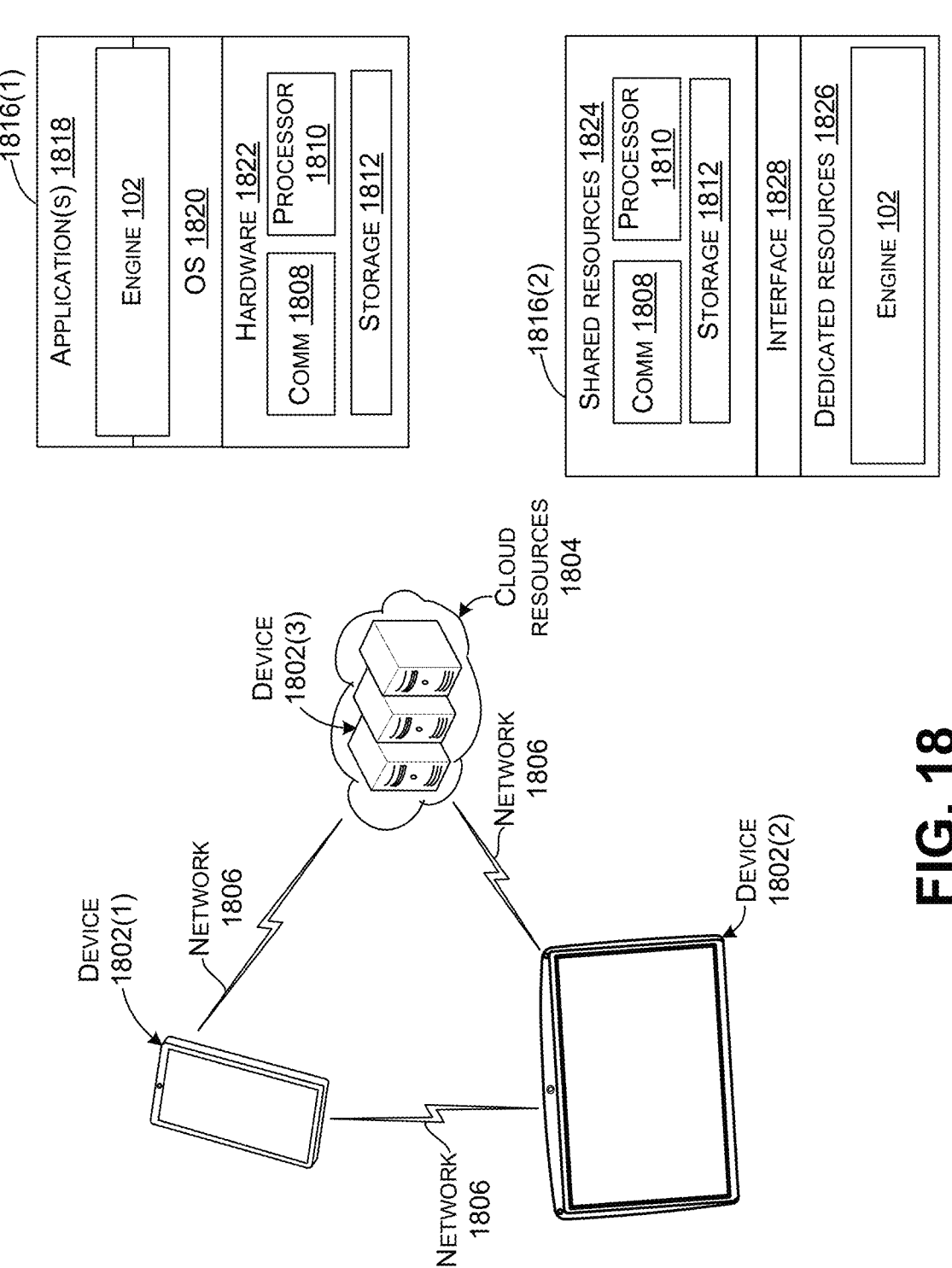
FIG. 18 is a schematic diagram of an example computer system in various forms, each of which can be used to implement aspects of the present technology.

FIG. 18 shows an example system 1800. System 1800 can include computing devices 1802. In the illustrated configuration, computing device 1802(1) is manifest as a smartphone, computing device 1802(2) is manifest as a tablet type device, and computing device 1802(3) is manifest as a server type computing device, such as may be found in a datacenter as a cloud resource 1804. Computing devices 1802 can be coupled via one or more networks 1806 that are represented by lightning bolts. Computing devices 1802 can include a communication component 1808, a processor 1810, and storage resources (e.g., storage) 1812.

FIG. 18 shows two device configurations 1816 that can be employed by computing devices 1802. Individual computing devices 1802 can employ either configuration 1816(1) or 1816(2), or an alternate configuration. (Due to space constraints on the drawing page, one instance of each configuration is illustrated). Briefly, device configuration 1816(1) represents an operating system (OS) centric configuration. Device configuration 1816(2) represents a system on a chip (SOC) configuration. Device configuration 1816(1) is organized into one or more applications 1818, operating system 1820, and hardware 1822. Device configuration 1816(2) is organized into shared resources 1824, dedicated resources 1826, and an interface 1828 therebetween.

In configuration 1816(1), the engine 102 can be manifest as part of the operating system 1820. Alternatively, the engine 102 can be manifest as part of the applications 1818 that operates in conjunction with the operating system 1820 and/or processor 1810. In configuration 1816(2), the engine 102 can be manifest as part of the processor 1810 or a dedicated resource 1826 that operates cooperatively with the processor 1810.

The term "device," "computer," or "computing device" as used herein can mean any type of device that has some amount of processing capability and/or storage capability. Processing capability can be provided by one or more processors that can execute data in the form of computer-readable instructions to provide functionality. Data, such as computer-readable instructions and/or user-related data, can be stored on/in storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1816(2) can be thought of as a system on a chip (SOC) type configuration. In such a case, functionality provided by the device can be integrated on a single SOC or multiple coupled SOCs. One or more processors 1810 can be configured to coordinate with shared resources 1824, such as storage 1812, etc., and/or one or more dedicated resources 1826, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Additional Examples

Various examples are described above. Additional examples are described below. One example includes a method comprising receiving a request related to a data item, managing a set of mini-pages in a buffer pool, each mini-page configured with a size that is dynamically adjustable based on the request, determining when the data item is in a mini-page of the set of mini-pages, performing the request on the mini-page when located, adjusting the size of the mini-page to accommodate changes based on the request, updating a mapping table having mappings that correlate mini-page identifiers with locations of the set of mini-pages in a database, and selectively caching the data item or evicting the data item from the buffer pool to disk storage based on probabilities and access patterns.

Another example can include any of the above and/or below examples where when the request includes a write operation, the method includes adjusting a size of a mini-page by enlarging the mini-page to accommodate additional data of the write operation.

Another example can include any of the above and/or below examples where the method further comprises determining a size of the mini-page exceeding a page size threshold and evicting the mini-page to disk storage.

Another example can include any of the above and/or below examples where selectively caching the data item includes inserting the data item into a mini-page that is configured to double in size upon reaching capacity to accommodate subsequent write operations without requiring immediate eviction.

Another example can include any of the above and/or below examples where the data item is cached in a mini-page, and the caching includes adjusting a probability of caching additional records within a same mini-page based on a pre-determined threshold of data item accesses, such that the mini-page grows to accommodate additional records only when existing records meet a minimum frequency of access.

Another example can include any of the above and/or below examples where updating the mapping table includes dynamically adjusting the mappings to reflect changes in the mini-page configurations.

Another example includes a method comprising initializing a buffer pool in a memory system of a computer, the buffer pool is configured to dynamically allocate and manage mini-pages and each of the mini-pages is adaptable in size based on data operation requirements, receiving a data operation request, determining whether a data item of the data operation request is located in one of the mini-pages of the buffer pool, adjusting a size of a selected mini-page dynamically in response to the data operation request, the adjusting includes increasing or decreasing a size of the selected mini-page based on an operational parameter of the data operation request, managing caching of data items within the mini-pages based on probabilities and access patterns including prioritizing frequently accessed data items for retention within the buffer pool and relocating less frequently accessed data items to a storage system, and updating a mapping mechanism to correlate the mini-pages with physical locations within the memory system or the storage system.

Another example can include any of the above and/or below examples where the method further comprises determining a size of the selected mini-page exceeding a page size threshold due to write operations or the mini-page remains unaccessed while in a copy-on-access region of a circular buffer and evicting the selected mini-page to the storage system.

Another example can include any of the above and/or below examples where adjusting the size of the selected mini-page includes doubling the size of the selected mini-page when the selected mini-page is determined to be full due to a data operation request.

Another example can include any of the above and/or below examples where managing the caching of data items includes implementing a selective caching strategy that caches a newly read record from the storage system into the selected mini-page when the record is determined to be frequently accessed.

Another example can include any of the above and/or below examples where the method further comprises modifying the selective caching strategy based on observed access patterns, such that the selected mini-page dynamically prioritizes the caching of frequently accessed records, optimizing memory usage within the buffer pool.

Another example includes a system comprising a processor and a memory for storing instructions that are executed by the processor to receive a data operation request for a data item in a database, access a variable-length buffer pool, the variable-length buffer pool storing mini-pages, each of the mini-pages being configured to be dynamically size adjusted based on the data operation request, determine whether the data item is contained within an existing mini-page of the variable-length buffer pool, when the data item is not contained within an existing mini-page, allocate a new mini-page within the variable-length buffer pool, the size of the new mini-page determined based on the size of the data item and an attribute of the data operation request, execute the data operation request on a selected mini-page, and when the data operation request is a write operation, the size of the selected mini-page is adjusted by the processor to accommodate new data without requiring modification of adjacent data structures, update a mapping table that correlates mini-page identifiers with physical memory locations of the mini-pages, cache the data item in the selected mini-page based on a frequency of access parameter, such that frequently accessed data items are retained within the selected mini-page in memory and infrequently accessed data items are moved to disk storage, and evict the selected mini-page from memory to disk storage based on a caching policy that prioritizes retention of mini-pages containing hot data items and the eviction of mini-pages containing cold data items.

Another example can include any of the above and/or below examples where the processor further executes the instructions to maintain data within each mini-page sorted by a key to enable execution of point lookups and range scans within the mini-page more efficiently.

Another example can include any of the above and/or below examples where the data operation request utilizes an array of KV (Key Value) Meta within each of the mini-pages to store metadata for supporting variable-length keys and values.

Another example can include any of the above and/or below examples where the processor allocates a new mini-page by setting an initial size of the new mini-page to align with a cache line size.

Another example can include any of the above and/or below examples where the processor updates the mapping table by employing an indirection array to translate logical page IDs to physical memory locations.

Another example can include any of the above and/or below examples where the variable-length buffer pool is configured with a locking mechanism for each of the mini-pages, comprising a reader-writer lock that is co-located with a page address within a word.

Another example can include any of the above and/or below examples where the processor is configured to implement a circular buffer that divides a portion of the memory into an in-place-update region and a copy-on-access region, and wherein modifications to the existing mini-page in the in-place-update region are performed directly on the existing mini-page, while modifications in the copy-on-access region result in one or more of the mini-pages being copied to a tail address to preserve accurate and timely access.

Another example can include any of the above and/or below examples where the circular buffer manages eviction by starting the evicting from a mini-page of the mini-pages closest to a head address and updating a mapping table to reflect changes in a physical location of evicted mini-pages in the disk storage.

Another example can include any of the above and/or below examples where allocation of memory for a mini-page within the circular buffer is performed by accessing a free list corresponding to a size category of the mini-page, and when the free list is exhausted, by advancing the tail address by a required size.

CONCLUSION

The description includes novel adaptive data storage management including the use of mini-pages. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device-implemented method, comprising:
receiving a request related to a data item;
managing a set of mini-pages in a buffer pool, each mini-page configured with a size that is dynamically adjustable based on the request;
determining when the data item is in a mini-page of the set of mini-pages in the buffer pool;
performing the request on the mini-page when located;
adjusting the size of the mini-page to accommodate changes based on the request;
updating a mapping table having mappings that correlate mini-page identifiers with locations of the set of mini-pages in a database; and
selectively caching the data item in the buffer pool using probabilities and access patterns,
wherein the data item is cached in the mini-page, and the caching includes adjusting a probability of caching additional records within a same mini-page based on a pre-determined threshold of data item accesses, such that the mini-page grows to accommodate additional records in instances when existing records meet a minimum frequency of access.

2. The method of claim 1, when the request includes a write operation, the method includes adjusting the size of the mini-page by enlarging the mini-page to accommodate additional data of the write operation.

3. The method of claim 1, further comprising:
determining the size of the mini-page exceeds a page size threshold; and
evicting the mini-page to disk storage.

4. The method of claim 1, wherein selectively caching the data item includes inserting the data item into the mini-page that is configured to double in size upon reaching capacity to accommodate subsequent write operations without requiring immediate eviction.

5. The method of claim 1, wherein updating the mapping table includes dynamically adjusting the mappings to reflect changes in mini-page configurations.

6. A device-implemented method, comprising:
initializing a buffer pool in a memory system of a computer, the buffer pool is configured to dynamically allocate and manage mini-pages and each of the mini-pages is adaptable in size based on data operation requirements;
receiving a data operation request;
determining whether a data item of the data operation request is located in one of the mini-pages of the buffer pool;
adjusting a size of a selected mini-page of the buffer pool dynamically in response to the data operation request, the adjusting including increasing or decreasing a size of the selected mini-page based on an operational parameter of the data operation request;
managing caching of data items within the mini-pages, the managing including prioritizing frequently accessed data items for retention within the buffer pool and relocating less frequently accessed data items to a storage system, wherein the caching is managed by caching a particular data item within the selected mini-page and adjusting a probability of caching additional records within the selected mini-page based at least on access patterns and a pre-determined threshold of data item accesses, such that the selected mini-page grows to accommodate additional records in instances when existing records meet a minimum frequency of access; and
updating a mapping mechanism to correlate the mini-pages with physical locations within the memory system.

7. The method of claim 6, further comprising:
determining that the size of the selected mini-page exceeds a page size threshold due to write operations or the mini-page remains unaccessed while in a copy-on-access region of a circular buffer; and
evicting the selected mini-page to the storage system.

8. The method of claim 6, wherein adjusting the size of the selected mini-page includes doubling the size of the selected mini-page when the selected mini-page is determined to be full due to the data operation request.

9. The method of claim 6, wherein managing the caching of data items includes implementing a selective caching strategy that caches a newly read record from the storage system into the selected mini-page when the record is determined to be frequently accessed.

10. The method of claim 9, further comprising modifying the selective caching strategy based on observed access patterns, such that the selected mini-page dynamically prioritizes the caching of frequently accessed records, optimizing memory usage within the buffer pool.

11. A system, comprising:

a processor; and a memory including a variable-length buffer pool for storing instructions that are executed by the processor to:

receive a data operation request for a data item in a database;

access the variable-length buffer pool, the variable-length buffer pool storing mini-pages, each of the mini-pages being configured to be dynamically size adjusted based on the data operation request;

determine whether the data item is contained within an existing mini-page of the variable-length buffer pool;

when the data item is not contained within an existing mini-page, allocate a new mini-page within the variable-length buffer pool, the size of the new mini-page determined based on the size of the data item and an attribute of the data operation request;

execute the data operation request on an existing or new selected mini-page, and when the data operation request is a write operation, the size of the selected mini-page is adjusted by the processor to accommodate new data without requiring modification of adjacent data structures;

update a mapping table that correlates mini-page identifiers with physical memory locations of the mini-pages; and, cache the data item in the selected mini-page based on a frequency of access parameter by adjusting a probability of caching additional records within the mini-page based on a pre-determined threshold of data item accesses.

12. The system of claim 11, wherein the processor further executes the instructions to maintain data within each mini-page sorted by a key to enable execution of point lookups and range scans within the mini-page more efficiently.

13. The system of claim 12, wherein the data operation request utilizes an array of KV (Key Value) Meta within each of the mini-pages to store metadata for supporting variable-length keys and values.

14. The system of claim 13, wherein the processor allocates the new mini-page by setting an initial size of the new mini-page to align with a cache line size.

15. The system of claim 14, wherein the processor updates the mapping table by employing an indirection array to translate logical page IDs to the physical memory locations.

16. The system of claim 15, wherein the variable-length buffer pool is configured with a locking mechanism for each of the mini-pages, comprising a reader-writer lock that is co-located with a page address within a word.

17. The system of claim 16, wherein the processor is configured to implement a circular buffer that divides a portion of the memory into an in-place-update region and a copy-on-access region, and wherein modifications to the existing mini-page in the in-place-update region are performed directly on the existing mini-page, while modifications in the copy-on-access region result in one or more of the mini-pages being copied to a tail address to preserve accurate and timely access.

18. The system of claim 17, wherein the circular buffer manages eviction by starting the evicting from a mini-page of the mini-pages closest to a head address and updating a mapping table to reflect changes in a physical location of evicted mini-pages in disk storage.

19. The system of claim 18, wherein allocation of memory for a mini-page within the circular buffer is performed by accessing a free list corresponding to a size category of the mini-page, and when the free list is exhausted, by advancing the tail address by a required size.

\* \* \* \* \*